US006929698B2

(12) United States Patent
Shutic et al.

(10) Patent No.: US 6,929,698 B2
(45) Date of Patent: Aug. 16, 2005

(54) VEHICLE POWDER COATING SYSTEM

(75) Inventors: Jeffrey R. Shutic, Wakeman, OH (US);
John F. Carlson, Westlake, OH (US);
Thomas E. Hollstein, Amherst, OH
(US); Keith E. Williams, Manchester,
MI (US); Ernest J. Fena, Rockey
River, OH (US); Harry J. Lader,
Lakewood, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/752,809

(22) Filed: Jan. 7, 2004

(65) Prior Publication Data

US 2004/0137144 A1 Jul. 15, 2004

Related U.S. Application Data

(63) Continuation of application No. 10/041,201, filed on Jan. 8, 2002, now Pat. No. 6,679,193, which is a continuation-in-part of application No. 08/066,873, filed on May 25, 1993, now abandoned.

(51) Int. Cl.[7] .......................... B05C 11/00; B05C 19/00; B05B 15/04
(52) U.S. Cl. ....................... 118/683; 118/684; 118/308; 118/310; 118/712
(58) Field of Search ................................ 118/308, 310, 118/313, 679, 683, 684, 712; 427/180

(56) References Cited

U.S. PATENT DOCUMENTS

| 3,439,649 A | 4/1969 | Probsi et al. |
| 3,741,155 A | 6/1973 | Hunder |
| 3,791,341 A | 2/1974 | Diamond et al. |

(Continued)

FOREIGN PATENT DOCUMENTS

| CH | 529 590 | 12/1972 |
| CH | 529590 | 12/1972 |
| DE | 1910487 | 9/1970 |
| DE | 1 910 487 | 9/1970 |
| EP | 0 480 664 A2 | 4/1992 |
| FR | 2289419 | 5/1976 |
| GB | 1 499 924 | 2/1978 |
| IT | 1 365 637 | 9/1974 |
| JP | 01115471 | 8/1989 |
| NL | 7712041 | 5/1979 |
| WO | WO 94/27736 | 12/1994 |

OTHER PUBLICATIONS

Fischer, John, "Practical Pneumatic Conveyor Design", Chemical Engineering, pp. 114–118, Jun. 1958.

Primary Examiner—Chris Fiorilla
Assistant Examiner—Yewebdar Tadesse
(74) Attorney, Agent, or Firm—Calfee, Halter & Griswold LLP

(57) ABSTRACT

An apparatus for applying powder coating material onto large objects such as automotive, truck or other vehicle bodies includes a powder spray booth defining a controlled area within which to apply powder coating material onto the vehicle bodies, a powder kitchen located at a remote position from the powder spray booth, and, a number of feed hoppers located proximate the booth which receive powder coating material from the powder kitchen and supply it to automatically or manually manipulated powder spray guns associated with the booth. Oversprayed powder coating material is removed from the booth interior by a powder collection and recovery system which transmits the oversprayed powder back to the powder kitchen for recirculation to the powder spray guns.

4 Claims, 14 Drawing Sheets

U.S. PATENT DOCUMENTS

| | | |
|---|---|---|
| 3,814,002 A | 6/1974 | Rombach et al. |
| 3,847,118 A | 11/1974 | Ambry |
| 3,870,375 A | 3/1975 | Duncan et al. |
| 3,909,068 A | 9/1975 | Coucher |
| 3,918,641 A | 11/1975 | Lehmann et al. |
| 3,931,787 A * | 1/1976 | Kuttner et al. .............. 118/674 |
| 3,951,099 A | 4/1976 | Minckler |
| 3,951,340 A | 4/1976 | Point |
| 4,044,175 A | 8/1977 | Coxon et al. |
| 4,065,532 A | 12/1977 | Wild et al. |
| 4,338,878 A | 7/1982 | Mason et al. |
| 4,345,858 A | 8/1982 | Barlow |
| 4,373,820 A | 2/1983 | Browning |
| 4,378,728 A | 4/1983 | Berkmann |
| 4,409,009 A | 10/1983 | Lissy |
| 4,471,715 A | 9/1984 | Gubler et al. |
| 4,505,623 A | 3/1985 | Mulder |
| 4,730,647 A | 3/1988 | Mulder |
| 4,824,295 A | 4/1989 | Sharpless |
| 4,907,720 A * | 3/1990 | Henson et al. ................ 222/55 |
| 5,018,909 A | 5/1991 | Crum et al. |
| 5,078,084 A | 1/1992 | Shutic et al. |
| 5,095,811 A | 3/1992 | Shutic et al. |
| 5,107,756 A | 4/1992 | Diaz |
| 5,147,152 A | 9/1992 | Link |
| 5,153,028 A | 10/1992 | Shutic et al. |
| 5,167,714 A | 12/1992 | Gimben et al. |
| 5,240,185 A | 8/1993 | Kaiju et al. |
| 5,454,872 A | 10/1995 | Lader et al. |
| 5,739,429 A | 4/1998 | Schmitkons et al. |
| 5,741,558 A | 4/1998 | Otani et al. |
| 5,743,958 A | 4/1998 | Shutic |
| 6,071,558 A | 6/2000 | Shutic |

* cited by examiner

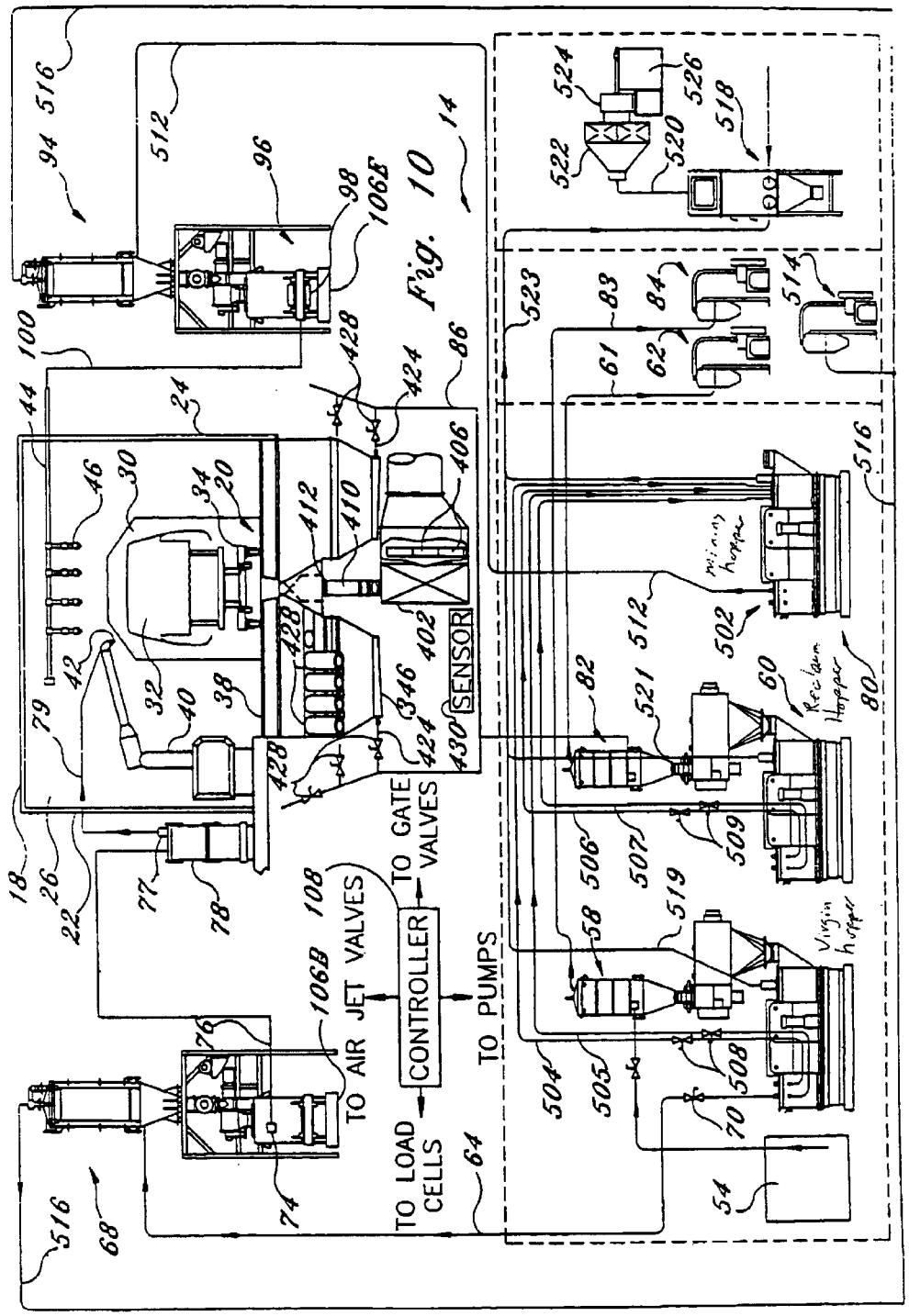

VEHICLE POWDER COATING SYSTEM

This is a continuation of U.S. patent application Ser. No. 10/041,201 filed Jan. 8, 2002 for VEHICLE POWDER COATING SYSTEM, now U.S. Pat. No. 6,679,193 which is a continuation-in-part of U.S. patent application Ser. No. 08/066,873 filed May 25, 1993 now abandoned for VEHICLE POWDER COATING SYSTEM, the entire disclosures of which are hereby incorporated by reference.

FIELD OF THE INVENTION

This invention relates to powder coating systems, and, more particularly, to a powder coating system for use in vehicle manufacturing facilities including a powder spray booth, a powder collection and recovery system, and a powder supply which transmits virgin powder coating material and a mixture of virgin and reclaimed, or oversprayed powder coating material from a remote location to coating dispensers associated with the spray booth.

BACKGROUND OF THE INVENTION

The application of coating materials to large objects such as automotive and other vehicle bodies has conventionally been accomplished in spray booths having an elongated tunnel-like construction formed with an inlet for the ingress of a vehicle body, a coating application area, a curing or drying area in some designs, and, an outlet for the egress of the vehicle body. In many systems, "conditioned" air, i.e. humidified and filtered air, is introduced by a blower or feed fan into a plenum chamber at the top of the spray booth and then directed downwardly toward the vehicle body moving through the booth. The conditioned air picks up oversprayed coating material within the booth interior and this air entrained oversprayed material is drawn downwardly through the floor or side of the booth by one or more exhaust fans. Filters are provided to capture the oversprayed coating material, and the resulting filtered or clean air is withdrawn from the booth and either exhausted to atmosphere or recirculated within the system for reuse.

The coating material in most common use for vehicles such as automobiles, trucks and the like is a high solids, resinous paint material which contains a relatively high percentage of liquid solvent components to facilitate atomization of the resinous material. The problems attendant to the recovery of oversprayed, resinous paint material have been well documented and present a continuing environmental problem for the coating and finishing industry. See U.S. Pat. No. 4,247,591 to Cobbs, et al. and U.S. Pat. No. 4,553,701 to Rehman, et al.

As disclosed in U.S. Pat. No. 5,078,084 to Shutic, et al., owned by the assignee of this invention, powder coating material has been suggested as an alternative to solvent based liquid paint materials for the coating of large objects such as vehicle bodies. In the practice of powder coating, a powdered resin is applied to the substrate and then the substrate and powder are heated so that the powder melts and when subsequently cooled, forms a solid continuous coating on the substrate. In most powder spraying applications, an electrostatic charge is applied to the sprayed powder which is directed toward a grounded object to be coated so as to increase the quantity of powder which attaches to the substrate and to assist in retaining the powder on the substrate. The application of powder material onto automotive or truck bodies is performed in a spray booth which provides a controlled area wherein oversprayed powder which is not deposited on the vehicle body can be collected. Containment of the oversprayed powder within the booth is aided by an exhaust system which creates a negative pressure within the booth interior and causes the oversprayed powder to be drawn through the booth and into a powder collection and recovery system. The recovered, oversprayed powder can be saved for future use, or is immediately recycled to powder spray guns associated with the powder spray booth.

A number of problems are inherent in coating automotive and other vehicle bodies with powder coating material. Due to the design of vehicle manufacturing facilities, the source of coating material is usually positioned at a remote location from the spray booth, i.e. as much as several hundred feet. Moreover, large quantities of powder coating material, e.g. on the order of 300 pounds per hour and up, must be transferred from the source to the spray booth over this relatively long distance at flow rates such as 1 to 2 pounds per second. Additionally, the powder coating material must be transferred with the appropriate density and particle distribution in order to obtain an acceptable coating of the powder material on the vehicle bodies. The term "density" refers to the relative mixture or ratio of powder-to-air, and the term "particle distribution" refers to the disbursion of powder particles of different sizes within the flow of air entrained powder material to the spray guns associated with the powder spray booth. It has been found that currently available powder coating systems are generally incapable and/or deficient in transporting large quantities of powder material at high flow rates over long distances, while maintaining the desired density and particle distribution.

As noted above, not all of the powder coating material discharged within the powder spray booth adheres to the vehicle bodies moving therethrough. This oversprayed powder material is collected by a powder collection and recovery system at the base of the booth as disclosed, for example, in U.S. Pat. No. 5,078,084 to Shutic, et al. In systems of this type, the powder collection and recovery system includes individual groups or bank of cartridge filters each contained within a series of individual powder collection chambers mounted side-by-side beneath the floor of the spray booth. A single exhaust fan or blower creates a negative pressure within the booth interior, which draws oversprayed, air entrained powder material into each of the individual powder collection chambers where the powder is collected on the walls of the cartridge filters and "clean air" passes therethrough for eventual discharge to atmosphere. Reverse air jets are operated to dislodge the collected powder from the walls of the cartridge filters which then falls to the base of the powder collection chambers where it is removed for collection or recirculation back to the spray guns associated with the powder spray booth.

In high volume applications such as coating automotive vehicle bodies, serviceability of the powder collection and recovery system, and, the application of a uniform negative pressure within the booth interior are of particular concern. It has been found somewhat difficult in certain instances to obtain a uniform negative pressure within the booth interior using a single exhaust or blower fan, which, in turn, adversely affects the efficiency with which the powder coating material can be collected and also can disrupt the pattern of powder coating material discharged from the spray guns onto the vehicle bodies moving through the booth. There has also been a need in systems of this type to improve the serviceability of the reverse air jet valves and cartridge filters contained within each powder recovery chamber.

An additional problem with powder coating systems of the type described above involves recovery of oversprayed powder for recirculation back to the spray guns associated with the powder spray booth. Virgin powder coating material contains a wide particle size distribution, i.e. it includes powder particles which vary substantially in size. The larger powder particles tend to more readily adhere to an object to be coated within the spray booth because they receive a higher electrostatic charge due to their size than smaller particles, and because larger, heavier particles have more momentum than smaller particles when discharged from a spray gun toward an object to be coated. As a result, the oversprayed powder which does not adhere to the object and is collected for recirculation back to the spray guns contains a proportionately greater percentage of smaller particles than the virgin powder since a greater percentage of larger particles in comparison to smaller particles have adhered to the object.

It has been found that the stability of operation of a powder coating system is dependent, at least in part, on avoiding a buildup or accumulation of "fines," e.g. particles having a size of less than about 10 microns. The term. "stability" as used herein refers to the ability of the system to fluidize, transfer and spray powder coating material without problems created by excessive levels of fines. The presence of excessive levels of fines within the powder coating material can result in poor fluidization of the powder, impact fusion, blinding or clogging of filter cartridges and sieve screens, increased powder buildup on interior surfaces of the powder spray booth and on spray guns, and, poor transfer efficiency. The term "impact fusion" refers to the adherence of a powder particle onto a surface as a result of particle velocity as opposed to electrostatic attraction, and "transfer efficiency" is a measure of the percentage of powder material which adheres to an object compared to the total volume of powder sprayed toward the object.

There is essentially no provision in powder coating systems of the type described above to ensure system operating stability when oversprayed powder material is recirculated back to the spray guns after collection. Although venting units have been employed to remove fines from supply hoppers and the like, such units are of limited effectiveness and cannot be relied upon to control with desired accuracy the level or percentage of fines within a given supply hopper.

SUMMARY OF THE INVENTION

It is therefore among the objectives of this invention to provide a powder spraying system for applying powder coating material onto large objects such as automotive or other vehicle bodies which is capable of transmitting large quantities of powder material over long distances at relatively high flow rates while maintaining the desired density and particle distribution, which is capable of automatically maintaining the appropriate volume of powder coating material within the system irrespective of demand, which efficiently collects and recovers large quantities of oversprayed powder for recirculation, which avoids the accumulation of excessive levels of fines, and, which is comparatively easy to service.

These objectives are accomplished in an apparatus for applying powder coating material onto large objects such as automotive, truck or other vehicle bodies which includes a powder spray booth defining a controlled area within which to apply powder coating material onto the vehicle bodies, a "powder kitchen" located at a remote position from the powder spray booth, and, a number of feed hoppers located proximate the booth which receive powder coating material from the powder kitchen and supply it to automatically or manually manipulated powder spray guns associated with the booth. Oversprayed powder coating material is removed from the booth interior by a powder collection and recovery system which transmits the oversprayed powder back to one or more mixing hoppers within the powder kitchen for recirculation to the powder spray guns.

One aspect of this invention is predicated upon the concept of providing an efficient means for the transfer of powder coating material from a remote location, i.e. at the powder kitchen, to the feed hoppers located proximate the spray booth. This is accomplished in the apparatus of this invention by a powder transfer system which is operated using vacuum or negative pressure instead of positive pressure. The powder kitchen, includes one or more primary hoppers each coupled to a powder receiver unit connected to a source of virgin powder coating material within the powder kitchen. A transfer line interconnects the primary hopper with a powder receiver unit associated with each of the feed hoppers at the spray booth. A first vacuum pump is operative to create a negative pressure within the powder receiver unit associated with the primary hopper to draw virgin powder material from the source into the powder receiver unit which, in turn, supplies powder to the primary hopper. A second vacuum pump applies a negative pressure within each powder receiver unit associated with the feed hoppers so that virgin powder material from the primary hopper located in the powder kitchen is drawn through the long transfer line into the powder receiver units associated with the feed hoppers in the vicinity of the spray booth. The powder receiver units at the spray booth fill their respective feed hoppers with powder, which, in turn, is transferred from the feed hoppers by powder pumps to powder spray guns within the spray booth.

This same principal of powder transfer under the application of negative pressure is employed in the collection of oversprayed powder material from the spray booth. A reclaim hopper located in the powder kitchen is coupled to a powder receiver unit connected by a reclaim line to the powder collection and recovery system associated with the powder spray booth. A vacuum pump creates a negative pressure within the powder receiver unit associated with the reclaim hopper which receives oversprayed powder from the booth, and, in turn, transfers such oversprayed powder to the reclaim hopper. In one presently preferred embodiment, this reclaimed, oversprayed powder is then transmitted from the reclaim hopper under the application of negative pressure by another vacuum pump to supply the oversprayed powder to powder receiver units connected to feed hoppers located near the booth. These feed hoppers then supply the oversprayed powder to spray guns associated with the spray booth which are operative to apply the powder to other portions of the vehicle body being coated.

In an alternative embodiment, the reclaim hopper and primary hopper are each connected to a mixing hopper located within the powder kitchen. Powder pumps within the primary and reclaim hoppers transfer a selected ratio of virgin powder and reclaim or oversprayed powder into the mixing hopper where such powders are intermixed in preparation for transfer to spray guns associated with the spray booth. In accordance with a method of this invention wherein particle size distribution within the powder contained in the mixing hopper is mathematically predicted, the supply of virgin and reclaim powder introduced into the mixing hopper, is controlled so that the volume percentage of fines contained within the mixing hopper does not exceed a predetermined maximum percentage. This ensures stable operation of the powder coating system when applying reclaim or oversprayed powder onto objects within the booth.

It has been found that large quantities of powder coating material, e.g. on the order of 300 pounds per hour and up, can be efficiently and effectively transmitted by the vacuum transfer system described above to satisfy the particular demands of automotive manufacturing facilities wherein the source of the powder coating material is located remote from the powder spray booth. It is believed that the use of vacuum, as opposed to positive pressure, uses less air and therefore reduces the overall energy requirements of the system. Additionally, in the event of a leak in one of the transfer lines extending between the powder kitchen and spray booth, the powder material is drawn inwardly within such transfer lines because of the vacuum therein instead of being forced outwardly as would be the case with a positive pressure powder transfer system. This reduces the risk of contamination of the facility with powder in the event of a leakage problem.

Another feature related to the powder transfer aspect of this invention involves the automatic monitoring and replenishment of virgin powder coating material and oversprayed powder material as the coating operation proceeds. Each of the primary hoppers, reclaim hoppers and feed hoppers is carried by a load cell connected to a programmable logic controller. These load cells are set on a zero reference with the empty weight of their respective hoppers, and are effective to measure the weight of powder material which enters each individual hopper during operation of the system. Considering a primary hopper, for example, the load cell associated therewith sends a signal to the controller indicative of the weight of powder within such primary hopper during operation of the system. In the event the quantity of powder material within the primary hopper falls beneath a predetermined minimum, the controller receives a signal from the load cell and operates the vacuum pump connected to the powder receiver unit associated with such primary hopper so that additional, virgin powder coating material is transmitted from the source, into the powder receiver unit and then to the primary hopper. Once that primary hopper receives a sufficient level of powder coating material, further supply of powder is terminated. The reclaim hopper and feed hoppers operate in the same manner so that appropriate levels of powder coating material are maintained in each during a powder coating operation. In one embodiment, a connector line is provided between each primary hopper and reclaim hopper so that virgin powder coating material can be supplied from the primary hoppers to the reclaim hopper in the event the quantity of oversprayed powder material collected within the powder collection and recovery system of the spray booth is insufficient to maintain the quantity of powder material within the reclaim hoppers at the desired level.

In an alternative embodiment, the programmable controller governs the transfer of virgin powder coating material from each primary hopper, and the transfer of reclaim or oversprayed powder from associated reclaim hoppers, into a mixing hopper in accordance with a selected ratio determined by the method noted above and discussed in detail below. The mixing hopper, in turn, feeds a mixture of virgin and reclaim powder to one or more spray guns.

Another aspect of this invention involves the provision of structure within each of the primary hoppers, reclaim hoppers and feed hoppers to ensure that the powder coating material is transferred within the system, and supplied to the spray guns, with the desired density and particle distribution. In this respect, principals of operation similar to those employed in the powder feed hopper disclosed in U.S. Pat. No. 5,018,909 to Crum, et al., owned by the assignee of this invention, are used in the various hoppers of this invention. Generally, each of the hoppers herein include a porous plate which receives an upward flow of air directed through baffles located within an air plenum in the base portion of such hoppers. Agitators, including rotating paddles or blades, are located above the porous plate to ensure that the powder material is properly fluidized, has a homogeneous distribution of powder particles and has the appropriate density or air-to-particle ratio prior to discharge from the respective hoppers.

A still further aspect of this invention is predicated upon the concept of providing an efficient, easily serviceable powder collection and recovery system for the powder spray booth, which produces a uniform, downwardly directed flow of air within the booth interior. The powder collection and recovery system herein is modular in construction including a number of powder collection units mounted side-by-side along the length of the powder spray booth beneath its floor. Each of the powder collection units includes a powder collection chamber housing two groups or banks of cartridge filters mounted in an inverted V shape above an angled, fluidizing plate located at the base of the powder collection chamber. A limited number of individual powder collection units are connected by a common duct to a separate exhaust fan or blower unit. Each exhaust fan is effective to create a negative pressure within its associated powder collection units to draw air entrained, oversprayed powder material from the booth interior, downwardly through the floor of the booth and then into each of the powder collection chambers. The oversprayed powder material collects on the walls of the cartridge filters and "clean" air passes therethrough into clean air chambers associated with each powder collection unit. Pulsed jets of air are periodically introduced into the interior of the cartridge filters from air jet valves positioned thereabove to dislodge powder collected on the walls of the filters which then falls onto the angled fluidizing plate at the base of each powder collection chamber for removal. Each powder collection chamber has an outlet connected to a common header pipe, and a gate valve is positioned in each of these outlet lines. The system controller is effective to sequentially open and close the gate valves so that collected powder material is removed from the various powder collection units in sequence for transfer to the reclaim hopper associated with the powder kitchen.

The construction of the powder collection and recovery system herein provides a number of advantages. Because a number of exhaust or blower units are employed, each associated with a limited number of powder collection units, a more uniform and evenly distributed downward flow of air is created within the interior of the powder spray booth along its entire length. This is an improvement over systems having a single exhaust fan or blower because it has proven difficult to obtain a uniform negative pressure within a spray booth having the extreme length required to coat large objects such as vehicle bodies with only one blower unit. Servicing of the powder collection and recovery system herein is also made much easier than in prior designs. The reverse air jet valves are located at the top of the powder collection units for easy access, and the cartridge filters are easily removed from the powder collection chambers by one operator. Removal of powder material from each of the powder collection chambers is also made easier by the angled, fluidizing plate at the base thereof which aids in smoothly transferring powder out of the chambers.

Additionally, the walls of the powder collection chamber are made sufficiently thin so that they are vibrated when the reverse jets of air are activated to assist in the transfer of powder onto the porous plate.

DESCRIPTION OF THE DRAWINGS

The structure operation and advantages of the presently preferred embodiment of this invention will become further apparent upon consideration of the following description, taken in conjunction with the accompanying drawings, wherein:

FIG. 10 is a view similar to FIG. 1, except of an alternative embodiment of the powder coating system of this invention;

DETAILED DESCRIPTION OF THE INVENTION

Referring now to the Figs., one embodiment of the powder coating system 10 of this invention includes a powder spray booth 12, devices for transferring powder coating material from a powder kitchen 14 to the booth 12, and, a powder collection and recovery system 16 associated with the booth 12. These system elements are described separately below, including a discussion of the operation of each.

Powder Spray Booth

Figure 1:
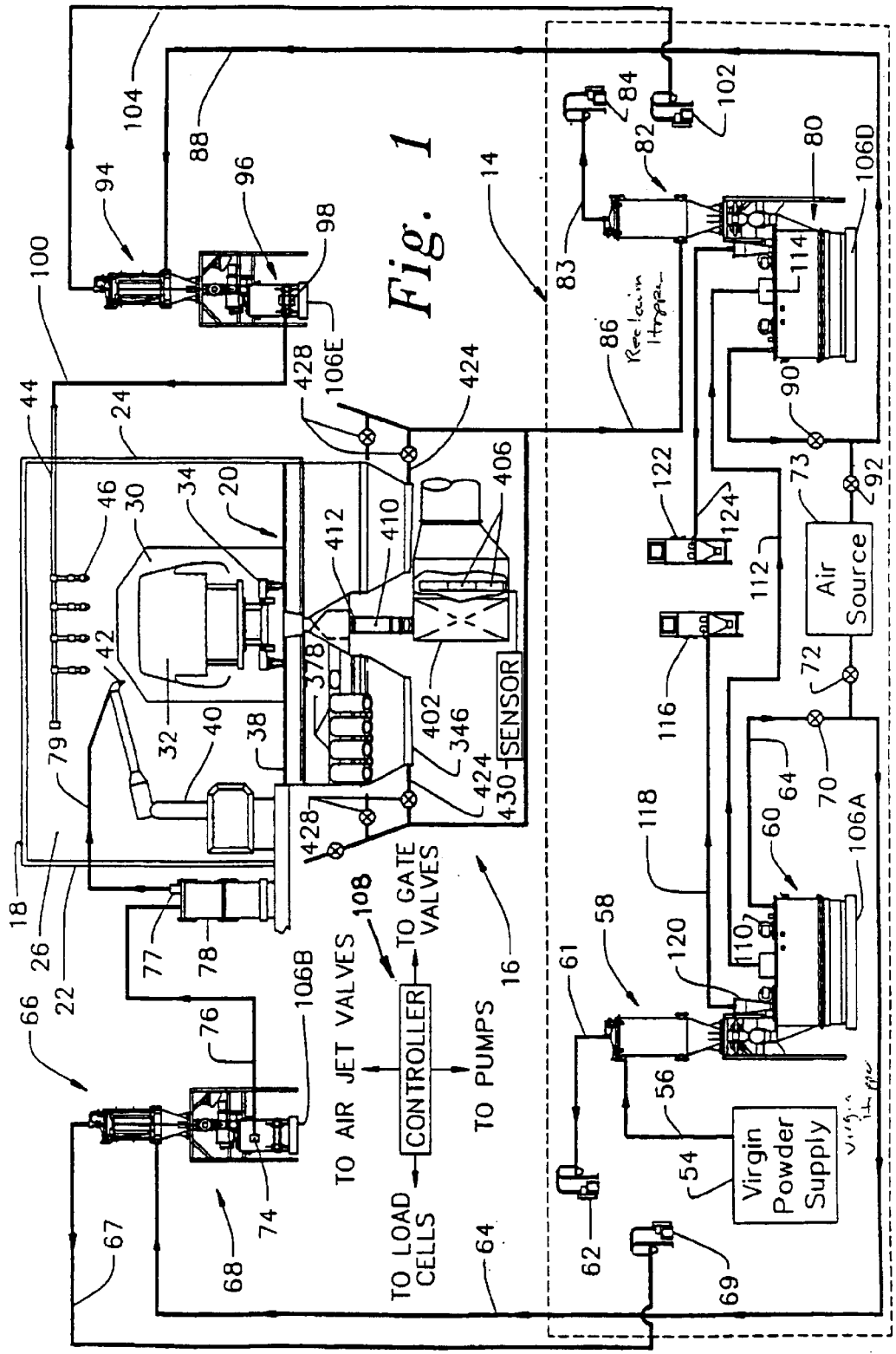
FIG. 1 is a partial schematic view of one embodiment of this invention depicting one end of a powder spray booth including feed hoppers and a portion of a powder collection recovery system, and including a schematic depiction of the powder kitchen.
Figure 2:
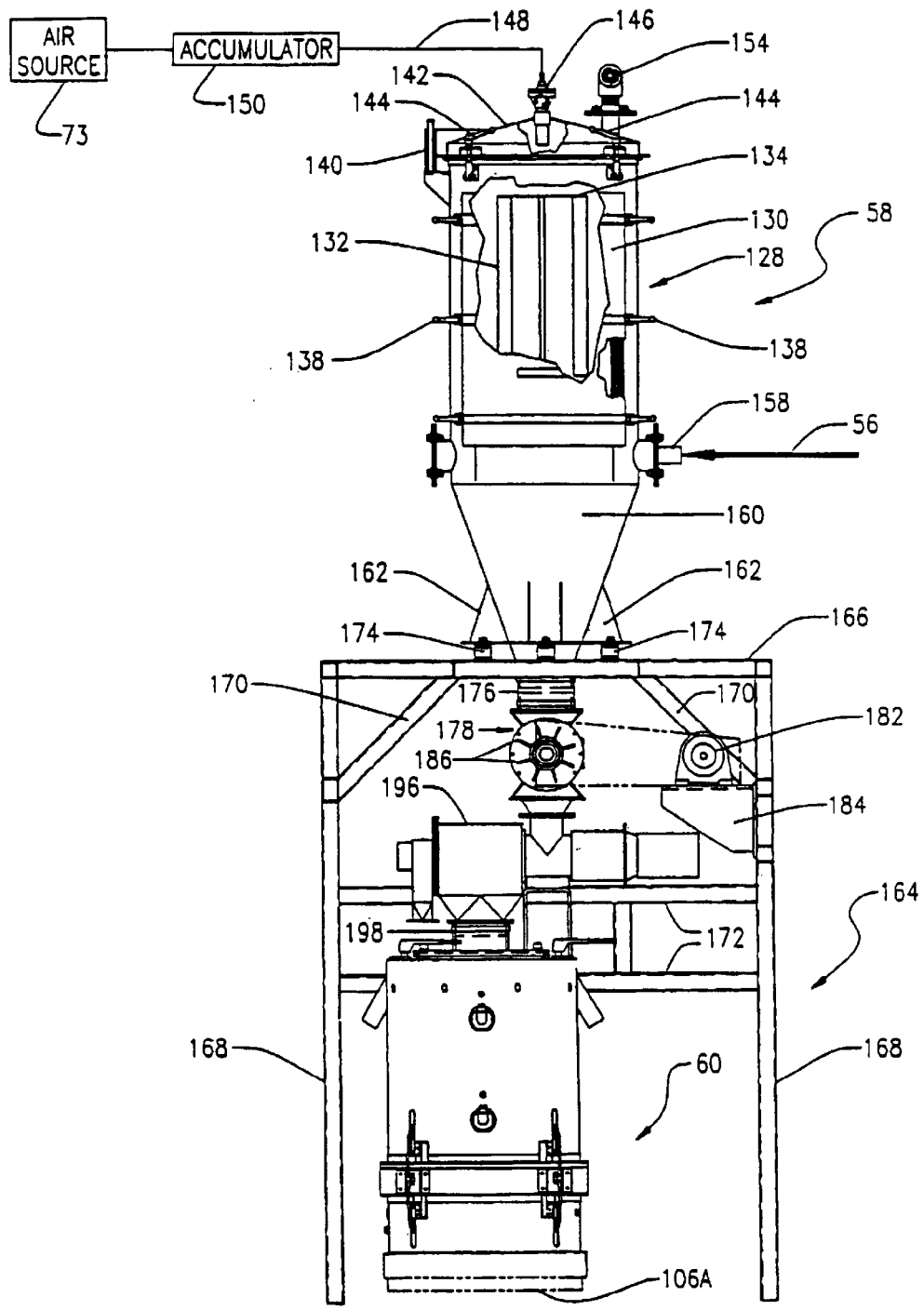
FIG. 2 is an elevational view of a powder receiver unit and primary hopper contained within the powder kitchen.

Referring to FIGS. 1 and 2, the powder spray booth 12 includes a ceiling 18, floor 20, opposed side walls 22, 24 and opposed end walls defining a booth inlet 26 and a booth outlet 28. See also FIG. 7. This construction of spray booth 12 defines an interior 30 forming a controlled area in which to apply powder coating material onto objects such as a vehicle body 32 moved by a conveyor 34 through the longitudinally extending center portion 36 of the spray booth 12. Oversprayed powder material which does not adhere to the vehicle body 32 passes through gratings 38 located along the floor 20 of spray booth 12 and into the powder collection and recovery system 16 described in detail below.

The powder spray booth 12 extends for a substantial longitudinal distance, and can be provided with a variety of powder spray guns positioned at different locations therealong so that all areas of the vehicle body 32 are coated with powder coating material in the course of passage through the booth interior 30. For purposes of illustration, a robot 40 carrying a spray gun 42 is depicted on one side of the spray booth 12, and an overhead gun manipulator 44 is illustrated in position above the vehicle body 32 carrying spray guns 46. Depending upon the size of the vehicle body 32, the types of powder coating material to be applied thereto, the desired areas of coverage on the vehicle body 32 and other factors, essentially any number of spray guns manipulated either automatically or manually can be provided along the length of the spray booth 12 for covering the vehicle body 32 with powder coating material. The particular location and operation of such spray guns forms no part of this invention of itself, and is therefore not discussed herein.

In the presently preferred embodiment, the vehicle body 32 is held at ground potential by the conveyor 34 and an electrostatic charge is imparted to the powder coating material by the spray guns 42 and 46. The electrostatic charge applied to the powder material increases the quantity of powder which adheres to the vehicle body 32, and assists in retaining powder thereon, but a relatively large quantity of powder material is nevertheless "oversprayed", i.e. fails to adhere to the vehicle body 32. This oversprayed powder must be collected and recovered in the course of the powder coating operation, as described below.

Powder Coating System of FIG. 1.

An important aspect of this invention involves the structure of system 10 for transferring the powder coating material from the powder kitchen 14 to the spray booth 12. In many vehicle manufacturing facilities, the powder kitchen 14 is positioned at a remote location from the spray booth 12, e.g. several hundred feet away, and a large quantity of powder coating material must be rapidly transmitted therebetween. Powder flow rates of 1–2 pounds per second, and total demand for powder of 300 pounds per hour and up, are not uncommon. The overall configuration of the powder transfer system of this invention which is capable of efficiently and economically satisfying such parameters is described first, followed by a detailed discussion of the various separate elements making up such transfer system.

In the embodiment of FIG. 1, the powder kitchen 14 is essentially a closed housing (not shown) which is provided with "conditioned" air, i.e. filtered and humidified air, supplied from an air house (not shown) of conventional design. Within the powder kitchen 14 is a source 54 housing virgin powder coating material, which is connected by a line 56 to a first powder receiver unit 58 described in detail below. The powder receiver unit 58 is connected to a primary hopper 60, and by a suction hose 61 to a first vacuum pump 62, both of which are housed in the powder kitchen 14. The primary hopper 60 is connected by a transfer line 64 to a second powder receiver 66 coupled to a first feed hopper 68. This transfer line 64 carries a first gate valve 70, and is connected to a first makeup air valve 72, both located downstream from the primary hopper 60 and within the, powder kitchen 14. The makeup air valve 72 is connected to a pressurized air source 73, depicted schematically in FIG. 1. As shown at the top of FIG. 1, the second powder receiver 66 and first feed hopper 68 are located proximate to the powder spray booth 12, but the transfer line 64 interconnecting the primary hopper 60 and second powder receiver 66 may be several hundred feet in length. The feed hopper 68 is connected by a line 67 to a third vacuum pump 69 housed within the powder kitchen 14, and carries a powder pump 74 (See FIG. 5) which is connected by a line 76 to a robot hopper 78. The robot hopper 78, in turn, is connected by a line 79 to the spray gun(s) 42 associated with robot 40.

Figure 5:
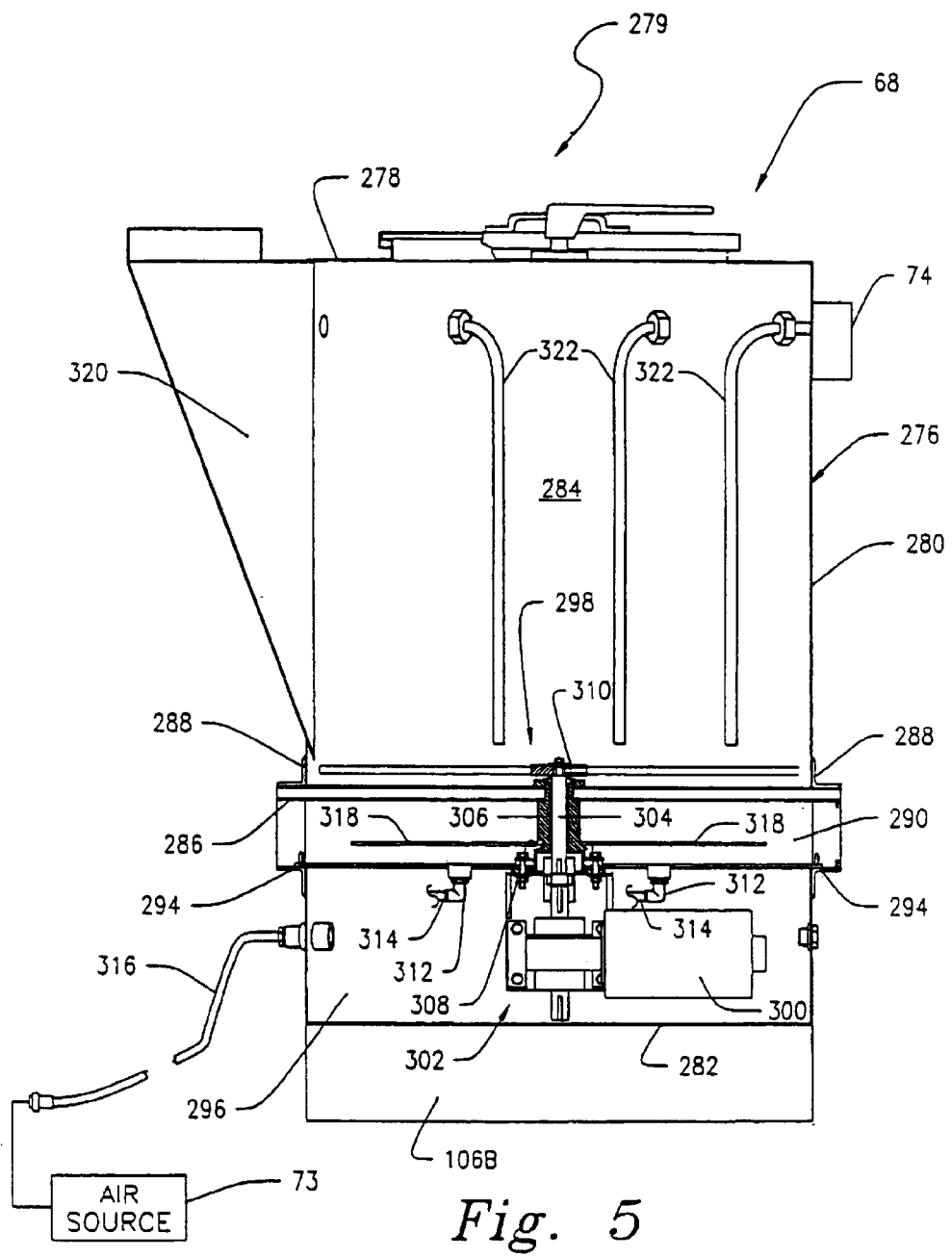
FIG. 5 is an elevational view in partial cross-section of one embodiment of a feed hopper of this invention.

The right hand portion of powder kitchen 14, as depicted in FIG. 1, contains similar structure to that described above in connection with primary hopper 60. Instead of receiving virgin powder coating material from container 54, this portion of the powder kitchen 14 is primarily supplied with collected, oversprayed powder from the collection and recovery system 16 of powder spray booth 12. In the presently preferred embodiment, the powder kitchen 14 houses a reclaim hopper 80 coupled to a third powder receiver unit 82 of the same type as receiver units 58 and 66. The third powder receiver unit 82 is connected by a line 83 to a third vacuum pump 84 located within the powder kitchen 14, and is joined by a reclaim suction line 86 to the powder collection and recovery system 16 as discussed below. A second transfer line 88, carrying a gate valve 90 and makeup air valve 92 connected to air source 73, interconnects the reclaim hopper 80 with a fourth powder receiver unit 94. This fourth powder receiver unit 94 is coupled to a second feed hopper 96 located proximate the powder spray booth 12. As schematically depicted in FIGS. 1 and 5, the second feed hopper 96 includes a positive pressure powder pump 98 which supplies powder material through a line 100 to the spray guns 46 associated with overhead gun manipulator 44. The fourth powder receiver unit 94 is connected to a fourth vacuum pump 102, located within the powder kitchen 14, by a line 104.

In the presently preferred embodiment, the primary hopper 60, first feed hopper 68, robot hopper 78, reclaim hopper 80 and second feed hopper 96 are each carried by an individual load cell 106A–E, respectively, of the type commercially available under Model Nos. FLB-3672-1K and H1242 PS-C500 from the Hardy Instruments Company. The load cells 106A–E are "zeroed" or adjusted to reflect a zero weight when each of their associated hoppers are empty of powder coating material. As discussed below, each load cell 106A–E is operative to measure the weight or quantity of powder coating material deposited in their associated hoppers and produce a signal representative of such weight reading. These signals are transmitted to a Programmable Logic Controller 108 (PLC), preferably of the type commercially available from Allen Bradley of Cleveland, Ohio, under Model No. PLC-5. The controller 108, in turn, operates each of the vacuum pumps 62, 71, 84 and 102, as well as valves 70, 72, 90 and 92, in response to the signals from load cells 106A–E.

Operation of Powder Coating System Depicted in FIG. 1.

A detailed discussion of the structure and operation of each individual element of the powder coating system 10 is given below, but the overall operation of one embodiment thereof can be described with reference to the schematic representation of FIG. 1. Unlike many prior systems, the powder coating system 10 of this invention employs negative pressure to transmit the powder coating material from the powder kitchen 14 to the powder spray booth 12. Additionally, the supply and transfer of powder is accomplished essentially automatically as the powder coating operation proceeds.

Referring initially to the left hand portion of the powder kitchen 14, virgin powder coating material is transferred from the source 54 when the controller 108 activates the first vacuum pump 62. The first vacuum pump 62 creates a negative pressure within the first powder receiver 58 which, in turn, draws the virgin powder coating material from source 54 through line 56 into the first powder receiver 58. As described below, the first powder receiver 58 discharges powder coating material into the primary hopper 60, and the quantity of such powder coating material received is monitored by the load cell 106A associated with primary hopper 60. When a predetermined level or quantity of powder coating material is present within primary hopper 60, its load cell 106A sends a signal representative of this condition to the controller 108, which, in turn, deactivates the first vacuum pump 62.

The transfer of powder coating material from primary hopper 60 to the first feed hopper 68 is also accomplished under the application of negative pressure. The controller 108 activates the second vacuum pump 69 to create a negative pressure within the second powder receiver 66 associated with first feed hopper 68. This negative pressure draws powder coating material from the primary hopper 60 into transfer line 64, and through the gate valve 70 therein which is opened by controller 108 simultaneously with the activation of second vacuum pump 69. The transfer of powder from primary hopper 60 is monitored by its load cell 106A which sends a signal to controller 108 when a predetermined quantity or weight of powder is emitted from primary hopper 60. The controller 108, in turn, closes the gate valve 70 within transfer line 64 to stop the flow of powder therethrough and turns off the second vacuum pump 69. Filling of the first feed hopper 68 with powder from the primary hopper 60 is accomplished by monitoring the weight or quantity of powder therein by its associated load cell 106B. When the quantity of powder in first feed hopper 68 falls below a predetermined level, its load cell 106B sends a signal to controller 108 to activate a metering device contained within the second powder receiver 66, as discussed in detail below. The powder transferred from primary hopper 60 to the second powder receiver 66 is then directed into the first feed hopper 68 until a predetermined weight is obtained therein, at which time a signal from load cell 106B to controller 108 causes the metering device within second powder receiver 66 to cease operation.

As schematically depicted at the top of FIG. 1, the powder coating material within the first feed hopper 68 is removed by the powder pump 74 (see also FIG. 5), under the application of positive pressure, and transmitted via line 76 into the robot hopper 78 carried by its own load cell 106C. Once the robot hopper 78 receives a sufficient quantity of powder coating material, as monitored by load cell 106C, the powder pump 74 is deactivated by controller 108 and a second powder pump 77 transfers the powder coating material from robot hopper 78 via line 79 to the spray guns 42 associated with robot 40 for application onto the vehicle body 32.

The purpose of the load cells 106A–E is to provide for essentially automatic operation of the system 10 so that the flow rate and total quantity of powder coating material being transferred through the system keeps pace with the demand as a given number of vehicle bodies 32 pass through the powder spray booth 12. The load cells 106A–C associated with primary hopper 60, first feed hopper 68 and robot hopper 78, respectively, are each operative to monitor the quantity or weight of powder coating material therein and provide a signal to the controller 108 in the event the quantity of powder falls below a predetermined level. When the controller 108 receives such signals, the appropriate vacuum pump or metering device is activated to transfer powder coating material into the hopper(s) whose supply of coating material has been depleted. In this manner, all of the hoppers 60, 68 and 78 have a continuous, adequate supply of powder coating material.

Because of the extreme length of transfer line 64, the powder kitchen 14 includes a valving arrangement to avoid the presence of residual powder coating material within transfer line 64 when the second vacuum pump 69 is turned off to stop the flow of powder coating material from the primary hopper 60 to the second powder receiver 66. As noted above, during the transfer operation from primary hopper 60 through second powder receiver 66, the controller 108 opens gate valve 70 within transfer line 64. When the load cell 106A associated with primary hopper 60 indicates a predetermined quantity of powder has been emitted therefrom, the controller 108 deactivates second vacuum pump 69, closes gate valve 70 and opens makeup air valve 72 within the powder kitchen 14. Pressurized air from the air source 73 then enters the transfer line 64 through makeup air valve 72 to "chase" or positively force the coating material which remains in transfer line 64 upstream from the powder kitchen 14 into the second powder receiver 66. This substantially prevents any accumulation of powder coating material within the transfer line 64 so that subsequent transfer operations of powder from the primary hopper 60 to the first feed hopper 68 can be performed quickly and efficiently.

With reference to the right hand portion of the powder kitchen 14, and top right hand portion of FIG. 1, the components of the powder transfer system which supply powder coating material to the spray guns 46 are depicted. As discussed above, such elements include the reclaim hopper 80, third powder receiver 82 and third and fourth vacuum pumps 84, 102 within the powder kitchen 14; and, the fourth powder receiver 94, second feed hopper 96 and third powder pump 98 located proximate the powder spray booth 12. The structure and operation of these elements is essentially identical to their counterparts on the left hand portion of FIG. 1, except that instead of transmitting solely virgin powder coating material from the powder kitchen 14 to the spray booth 12 such elements transmit primarily collected, oversprayed powder coating material received from the collection and recovery system 16.

In order to fill the reclaim hopper 80 with oversprayed powder material, the third vacuum pump 84 is activated by controller 108 which creates a negative pressure within third powder receiver 82 to draw powder coating material via reclaim line 86 from the collection and recovery system 16 into the third powder receiver 82. In a manner fully discussed below, the third powder receiver 82 deposits the oversprayed powder material into the reclaim hopper 80. The quantity of the powder entering the reclaim hopper 80 is monitored by load cell 106D associated therewith. From the reclaim hopper 80, the powder material is transferred to the fourth powder receiver 94 and second feed hopper 96 when the controller 108 activates fourth vacuum pump 102.

The negative pressure created within the fourth powder receiver 94 pulls powder from the reclaim hopper 80 into second transfer line 88, through the gate valve 90 opened by controller 108, and into the interior of fourth powder receiver 94. The second feed hopper 96 receives such powder from the fourth powder receiver 94, the quantity of which is monitored by load cell 106E associated therewith, and the positive pressure powder pump 98 subsequently transfers the powder from second feed hopper 96 through line 100 to the spray guns 46 carried by gun manipulator 44. The operation of vacuum pumps 84 and 102, and the metering device associated with fourth powder receiver 94, is governed by the controller 108 in the same manner as discussed above, i.e. in response to signals from the load cells 106D and 106E associated with the reclaim hopper 80 and second feed hopper 96, respectively. The operation of the positive pressure powder pump 98 is also governed by controller 108 depending upon the presence of vehicle bodies 32 within the powder spray booth 12. Valves 90 and 92 within the powder kitchen 14 function in the identical manner as valves 70 and 72 described above.

Before discussing each of the individual elements associated with the powder transfer system in detail, two additional features of the powder transfer system should be noted. It is contemplated that in some applications the total quantity of powder coating material required from the reclaim hopper 80 may exceed the amount of oversprayed, powder coating material supplied thereto by the collection and recovery system 16. In order to ensure that a sufficient quantity of powder coating material is always present within reclaim hopper 80, the primary hopper 60 containing virgin powder coating material includes a powder pump 110 connected by a line 112 to a minicyclone 114 carried by the reclaim hopper 80. This minicyclone 114 is commercially available from Nordson Corporation of Amherst, Ohio under Model No. PC-4-2. In the event the load cell 106D associated with reclaim hopper 80 senses less than the required weight of powder material within reclaim hopper 80, and sufficient powder cannot be supplied from the collection and recovery system 16, then the controller 108 activates powder pump 110 to transfer virgin powder coating material through line 112 and minicyclone 114 into the reclaim hopper 80 to supplement the total amount of powder therein. If such transfer is required, both virgin powder coating material and oversprayed, collected powder coating material from the booth 12 are intermixed within the reclaim hopper 80 and subsequently supplied to the spray guns 46 in the manner described above.

One further aspect of the powder transfer is system shown in FIG. 1 involves the utilization of a vent utility collector 116 located within the powder kitchen 14 which is connected by a line 118 to a vent 120 at the top of primary hopper 60. Similarly, a second vent utility collector 122, also contained within the powder kitchen 14, is connected by a line 124 to the vent 126 of reclaim hopper 80. Each of the vent utility collectors 116, 122 is operative to provide ventilation to the interior of the primary and reclaim hoppers 60, 82, respectively, and to remove "fines" from the upper portion of the interior of such hoppers 60, 82. The term "fines" as used herein refers to very small diameter particles of powder material, under $10\mu$ which usually concentrate near the upper portion of powder supply hoppers and are so small that they often do not become electrostatically charged when emitted from spray guns such as spray guns 42 and 46, nor do they have sufficient momentum to reach the article to be coated. Such small particles are usually not attracted to the surface of an article to be coated and therefore tend to collect within the system which reduces transfer efficiency, i.e. the proportion of particles which adhere to an article to be coated. These small particles or fines are therefore advantageously removed by the vent utility collectors 116 and 122 within the powder kitchen 14 for subsequent disposal.

Powder Coating System of FIG. 10 and Method of Operation.

With reference to FIG. 10, an alternative embodiment of a powder coating system 500 according to this invention is schematically depicted. The powder coating system 500 contains a number of the elements shown in FIG. 1 and described above, and therefore the same reference numbers are utilized in FIG. 10 to identify structure which is common to FIG. 1.

The principal distinction between the system 500 of FIG. 10 and the system 10 of FIG. 1 is based upon the recognition that for certain spray applications with various types of virgin powder coating materials, care must be taken to avoid excessive buildup of "fines." The term "fines" refers to powder particles having a size of less than about 10 microns. As noted above, excessive buildup of fines has been found to create problems of poor fluidization within the hoppers 60, 68, impact fusion on the parts to be coated, blinding of filter cartridges and sieve screens, increased powder buildup on the spray booth 12 and various coating dispensers 42, 46 and poor transfer efficiency. For many types of powder coating materials, a buildup of fines greater than or equal to about 30% of the total volume of the powder coating material results in one or more of the above named problems, although different percentages of fines can present problems in the application of other types of powder coating materials.

In addition to concerns over the buildup of excessive volumes of fines within the powder coating material supplied to spray guns 42, 46, appearance of the finished product is also a factor to be considered when applying particulate powdered coating material. For example, as the percentage of larger or courser particles increases, the surface finish tends to degrade e.g. particles greater than about 70 microns fail to flow out on the surface of the part being coated to the same extent as particles of about 10 microns, thus resulting in a rough surface finish. On the other hand, while smaller particles result in a better surface finish, the problems noted above are prevalent when the relative percentage of such small particles exceeds a predetermined level.

In order to address the problems of controlling excessive fine buildup while retaining acceptable surface finish, the system 500 shown in FIG. 10 has a powder kitchen 14 containing a mixing hopper 502 which is connected by a pair of supply lines 504, 505 to the primary hopper 60 containing virgin particulate powder material, and by a pair of supply line 506, 507 to the reclaim hopper 80 which receives oversprayed powder from the booth 12 as described above. A gate valve 508 is positioned in each of the supply lines 504, 505, respectively, extending from primary hopper 60 into mixing hopper 502, and lines 506, 507 between reclaim hopper 80 and mixing hopper 502 each mount a gate valve 509. The mixing hopper 502, in turn, is connected by a transfer line 512 to the fourth powder receiver unit 94, which, in the embodiment of FIG. 1, had been connected by line 88 to the reclaim hopper 80.

In addition to the foregoing, other structural changes in system 500 compared to the coating system 10 shown in FIG. 1, include the use of a single vacuum pump 514 connected by line 516 to each of the powder receivers 66 and 94. As described above, two vacuum pumps, 69 and 102, were utilized in the embodiment of FIG. 1 to provide a negative pressure for the transfer of coating material into the powder receiver 66, 94, respectively. Additionally, a single vent utility connector 518 is employed in the embodiment of FIG. 10 instead of the two vent utility collectors 116, 122 depicted in FIG. 1. Vent utility collector 518, which has a greater capacity than those described above, is connected by a line 520 to a filter unit 522 as shown at the righthand portion of the powder kitchen 14 of FIG. 10. The filter unit 522, in turn, is connected by a duct 524 to a fan 526. The vent utility collector 518 is connected by a line 519 to primary hopper 60, by a line 521 to reclaim hopper 80 and by a line 523 to mixing hopper 502.

As noted above in connection with a discussion of the vent utility collectors 116, 122 of FIG. 1., the purpose of vent utility collector 518 is to remove at least some of the fines present within the primary hopper 60, reclaim hopper 80 and mixing hopper 502 to avoid excessive fine buildup and the attendant problems with same described above. Nevertheless, the vent utility collectors 116, 122 and/or 518 are not by themselves sufficient to properly control the relative volume percentage of fines within the overall mixture of the virgin powder coating material and reclaim powder coating material supplied to at least some of the spray guns.

The powder coating system 500 of FIG. 10 operates in the same manner described above in connection with FIG. 1 except for the supply of the mixture of virgin powder coating material and reclaimed or oversprayed powder coating material supplied to coating dispensers 46. Instead of supplying the overspray powder material from reclaim hopper 80 directly to guns 46 as shown in FIG. 1 and noted above, the system 500 of this invention provides a means and method of operation to intermix virgin powder coating material with oversprayed or reclaim powder coating material in appropriate volume percentages to insure that an excessive fine buildup does not occur within the mixing hopper 502, and that an appropriate particle size distribution is obtained in such mixture supplied to the coating dispensers 46. The gate valves 508 associated with the virgin powder supply line 504, 505 and the gate valves 509 associated with the reclaim powder supply lines 506, 507, are operated by the controller 108 in accordance with a mathematical model executed by software within the controller 108. The purpose of the mathematical model is to predict the particle size distribution within the mixing hopper 502 at steady state operation, which can then be used to determine how much virgin powder coating material from feed hopper 60 must be added to the mixing hopper 502 for combination with the reclaim or oversprayed powder supplied to hopper 502 from reclaim hopper 80 to obtain "stable" operation i.e. an absence of excessive fines and a resultant powder mixture which can be readily fluidized, pumped and sprayed onto parts to be coated.

Figure 12:
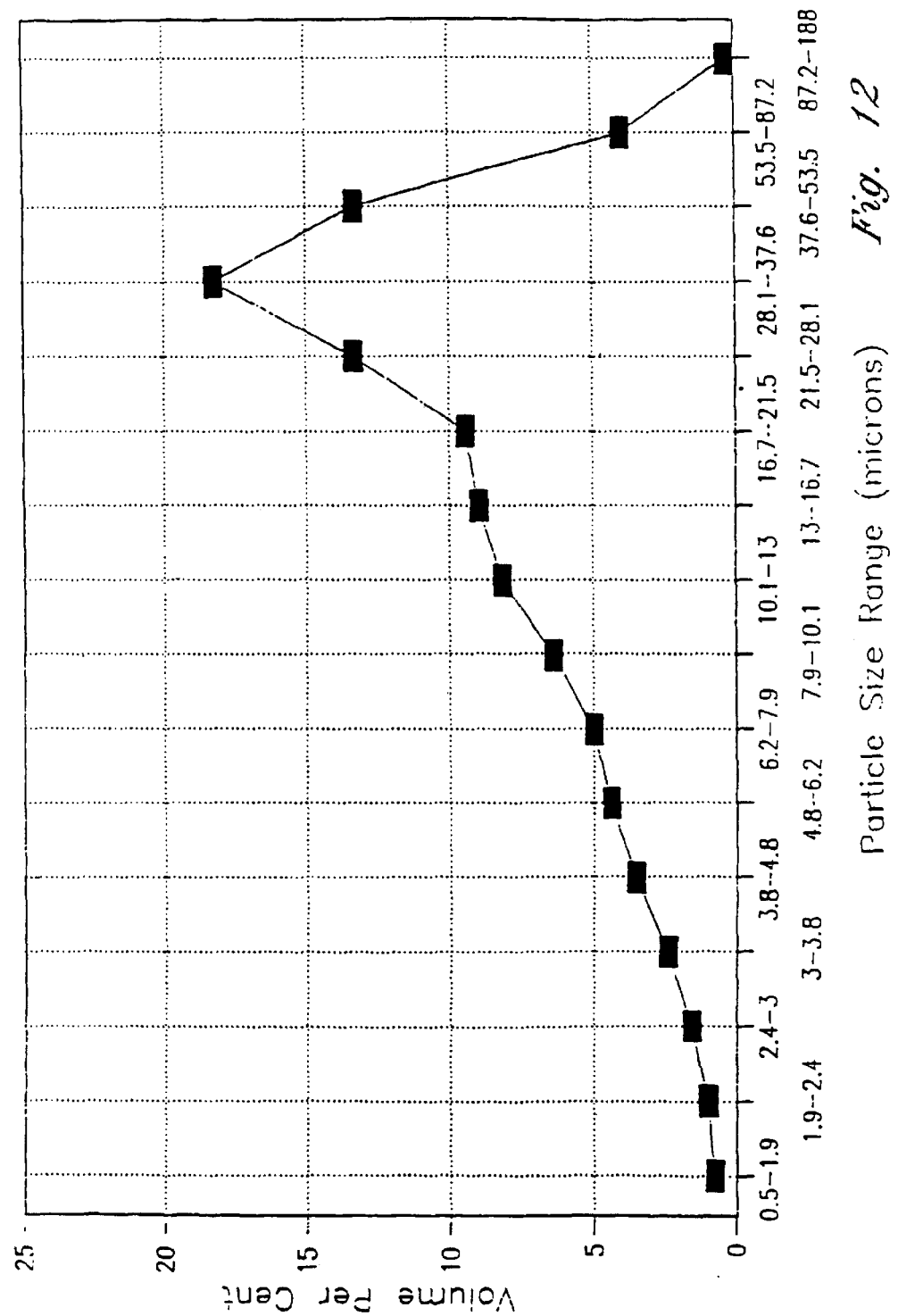
FIG. 12 is a graphical depiction of the particle size distribution, by volume percent, of virgin particulate powder coating material.
Figure 13:
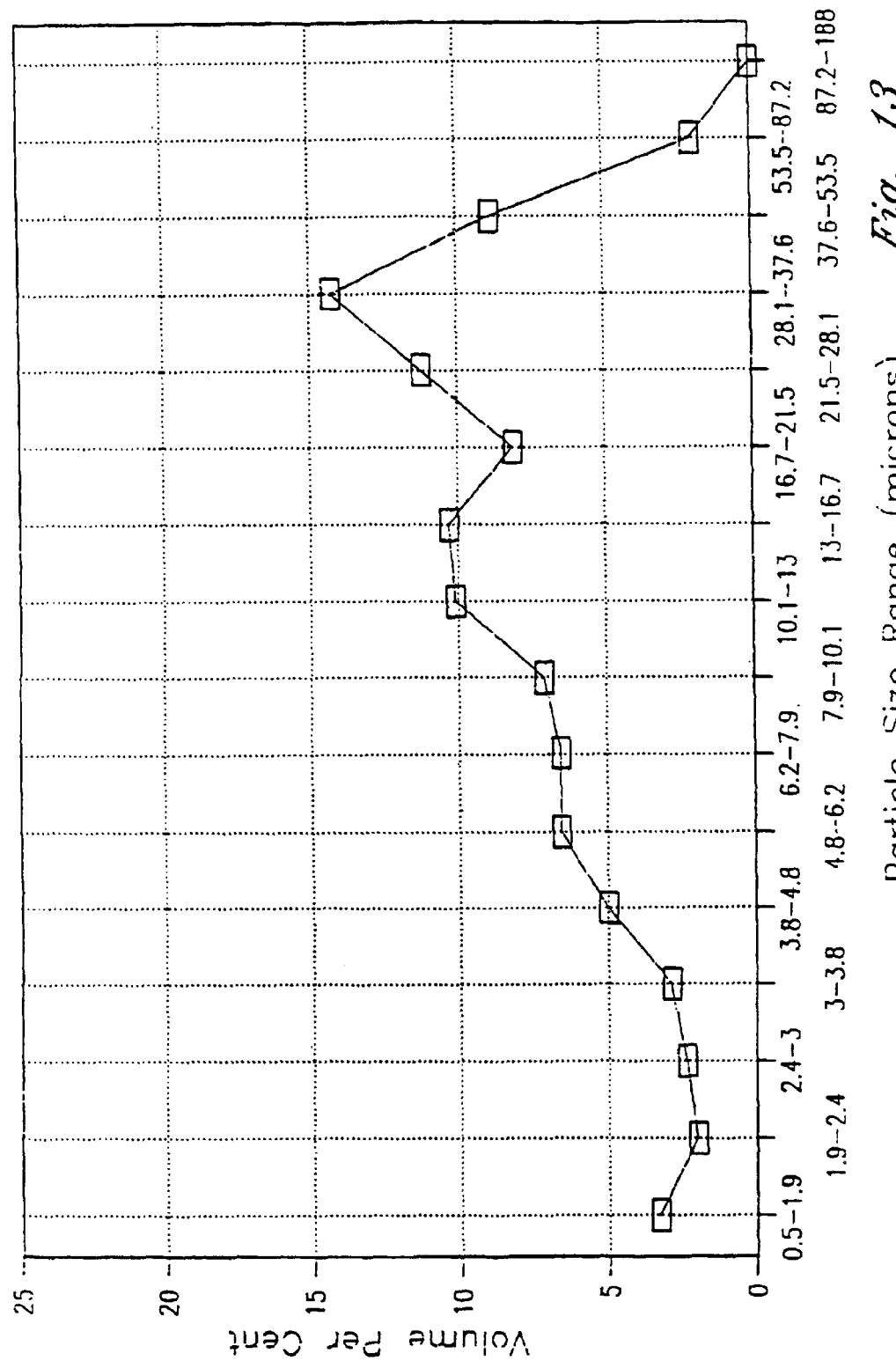
FIG. 13 is a graphical depiction of the particle size distribution, by volume percent, of reclaimed particulate powder coating material.

Referring initially to FIGS. 12 and 13, graphical depictions are provided of the particle size distribution within powder coating materials. The term "particle size distribution" refers to the volume percentage of powder particles within a particular size range in a given sample of powder coating material. FIG. 12 depicts the particle size distribution of virgin powder coating material sold under No. 158E114 manufactured by Ferro of Cleveland, Ohio. This virgin powder coating material has a median particle size of 22 microns, and the data points shown in the graph represent the volume percent of a total of sixteen particle size ranges within the virgin powder coating material of this type, as physically measured by a laser diffraction particle size analyzer such as a Malvern PSD analyzer commercially available from Malvern Instruments, Inc. of Southborough, Mass. The sixteen particle size ranges, e.g. 0.5–1.9μ, 1.9–2.4 μ, etc., were chosen for ease of illustration, and it is contemplated that various other particle size ranges could be employed in the following description of the method of this invention.

FIG. 13 is a graphical depiction similar to FIG. 12, except it is representative of the particle size distribution within particulate powder coating material which has been reclaimed or collected from the powder spray booth 12 from virgin powder coating material applied in one coating application onto a given vehicle body 32 within booth 12. In other words, FIG. 13 depicts the particle size distribution of powder coating material which did not adhere to a vehicle body 32 within spray booth 12 after a single spray operation with the virgin powder coating material depicted in FIG. 12. The particle size distribution of the powder shown in FIG. 13 was also measured by the Malvern PSD analyzer and, as shown, a greater percentage of smaller particles are present in the one pass oversprayed powder sample of FIG. 13 than in the virgin powder coating material of FIG. 12. This is generally due to the fact that larger powder particles are more easily and efficiently electrostatically charged by the coating dispensers 42 or 46 prior to deposition onto an object, and the larger mass of such larger particles provides them with greater momentum to flow to the vehicle body 32 within the spray booth 12.

The purpose of the mathematical model of this invention is to mathematically predict the particle size distribution of the powder which remains in the system, i.e. which does not adhere to a vehicle body 32 within booth 12, so that sufficient virgin powder coating material from primary hopper 60 can be introduced into mixing hopper 502 on a continuous basis during steady state operation of system 500 to avoid the buildup of excessive fines and maintain an acceptable overall particle size distribution.

In order to calculate the change in particle size distribution over time, a determination must be made of the probability of a particle remaining in the system. A brief description is provided below of how probability factors for each size range of the distribution are determined, followed by the mathematical details. The objective here is to find a set of numbers (probability factors) which, when multiplied by the virgin particle size distribution, will result in the oversprayed particle size distribution.

(i) Begin by obtaining a ratio of the virgin particle size distribution to the reclaim particle size distribution for each of the size ranges. This ratio is a measure of the relative tendency of the various particle sizes to be attracted to the part. Particle sizes having a ratio of one or greater will more likely be attracted to the part than particle sizes having a ratio of less than one. These latter particles will have a tendency to remain in the system.

(ii) Next, normalize the cumulative sum of the data from Paragraph (i) to 1.00 to ensure that we continue to have a probability distribution which accounts for 100% of all the particles.

(iii) The probability of powder remaining in the system is calculated by subtracting the above probability distribution for each particle size from the value "one" and normalizing. However, this mathematical operation still does not provide the required probability distribution. What we are looking for is a set of numbers which, when multiplied by the virgin particle size distribution, will result in the oversprayed particle size distribution.

(iv) An appropriate multiplier factor for each particle size is used on the distribution in Paragraph (iii) above in order to get a good match between this calculated particle size distribution and the particle size distribution of the oversprayed powder. This new set of numbers is also normalized, and the resulting values are the probability factors which are multiplied times the particle size distribution for each cycle through the system.

The initial step in the method outlined above involves physically measuring the particle size distribution, $F_v$, of the virgin powder coating material to be used in a given coating application using the Malvern PSD analyzer mentioned above. This material is then sprayed into a spray booth 12 of given configuration, with a particular vehicle body 32 to be coated present, and the oversprayed or reclaim powder coating material is then collected. For purposes of the present discussion, such oversprayed powder material is referred to as "one-pass reclaim," i.e. the powder reclaimed after one "pass" or spraying operation. The particle size distribution of the one-pass reclaim is then physically measured to obtain $F_r$.

As noted in FIGS. 12 and 13, the particle size "distribution" refers to the volume percentage of a total of sixteen (16) discrete particle size ranges from 0.5 microns to 188 microns. The terms $F_v$ and $F_r$ are therefore expressed as follows:

$$F_v = F_{v_{1-16}} \quad (1)$$
$$= F_{v_1}, F_{v_2}, \ldots F_{v_{1-16}}$$

where $F_{v_1}$=volume percentage of particles of virgin powder coating material having a size between 0.5–1.9μ

$F_{v_2}$=volume percentage of particles of virgin powder coating material having a size between 1.9–2.4μ etc.

$$F_r = F_{r_{1-16}} \quad (2)$$
$$= F_{r_1}, F_{r_2}, \ldots F_{r_{1-16}}$$

where $F_{r_1}$=volume percentage of particles of one-pass reclaim powder coating material having a size between 0.5–1.9μ

$F_{r_2}$=volume percentage of particles of one-pass reclaim powder coating material having a size between 1.9–2.4μ etc.

The measured particle size distributions $F_v$ and $F_r$ are input to the controller 108 which is effective to calculate the quotient of the particle size distribution as follows:

$$\frac{F_v}{F_r} = \frac{F_{v_{1-16}}}{F_{r_{1-16}}} \quad (3)$$
$$= \frac{F_{v_1}}{F_{r_1}}, \frac{F_{v_2}}{F_{r_2}} \ldots \frac{F_{v_{16}}}{F_{r_{16}}}$$

The quotients obtained from formula (3) noted above are then normalized in accordance with the following relationship:

$$1 = \sum \frac{F_v}{F_r} \quad (4)$$

This is accomplished in a two-step process wherein initially the sum of the quotients of $F_v/F_r$ or S, is obtained:

$$S = \frac{F_{v_1}}{F_{r_1}} + \frac{F_{v_2}}{F_{r_2}} \ldots \frac{F_{v_{16}}}{F_{r_{16}}} \quad (5)$$

Thereafter, the "normalized" value of the various quotients for each of the sixteen size ranges of particles shown in the graph of FIGS. 12 and 13 are calculated as follows:

$$1 = \frac{F_{v_1}/F_{r_1}}{S} + \frac{F_{v_2}/F_{r_2}}{S} \ldots \frac{F_{v_{16}}/F_{r_{16}}}{S} \quad (6)$$

The next sequence of calculations executed by software within the controller 108 leads to a solution for probability factors P, e.g. $P_{1-16}$, for each particle is size range. The probability factors $P_{1-16}$ are representative of the probability that particles within each of the sixteen size ranges depicted in FIGS. 12 and 13 will remain in the system 500, i.e. will not be attracted to the vehicle body 32 within booth 12 and therefore are reclaimed as oversprayed powder. This information is important because, as noted above, system stability is dependent on maintaining the volume percentage of fines within mixing hopper 502 below a predetermined level, such as 30%. The formula utilized to obtain the probability factor $P_{1-16}$ is given as follows:

$$P = F_A \left( 1 - \text{normalized} \, \Sigma F_{v_{F_r}} \right)_x \quad (7)$$

where:
$F_A$=adjustment factor
X=integers 1–16
P=probability factors $P_1, P_2 \ldots P_{16}$ The portion of equation (7) after the $F_A$ term is determined by the following two step calculation. First, a factor Z is calculated as follows:

$$Z = \sum_x \left( 1 - \frac{F_v/F_r}{S} \right)_x \quad (8)$$

$$= \left( 1 - \frac{F_{v_1}/F_{r_1}}{S} \right) + \left( 1 - \frac{F_{v_2}/F_{r_2}}{S} \right) \ldots \left( 1 - \frac{F_{v_{16}}/F_{r_{16}}}{S} \right)$$

The quotients obtained from the calculations based on equation (8) are then normalized to one (1):

$$1 = \left( 1 - \frac{F_{v_1}/F_{r_1}}{S} \right) + Z + \left( 1 - \frac{F_{v_2}/F_{r_2}}{S} \right) + Z + \ldots \quad (9)$$
$$\left( 1 - \frac{F_{v_{16}}/F_{r_{16}}}{S} \right) + Z$$

Each of the quotients obtained from the calculations based on equation (9) represents a normalized value for each of the sixteen particle size ranges from the graphs in FIGS. 12 and 13. These values are then used in equation (7) to obtain probability factors P for each particle size range, i.e. a representation of the probability that the particles within each size range will remain in the system (not attach to a part) after a particular coating operation.

For example, equation (7) can be written to obtain the probability factor $P_1$ for the powder particles having a size in the first group of particles,. 0.5–1.9 microns, as follows:

$$P_1 = F_{A_1} \left( 1 - \text{normalized} \, \frac{F_{v_1}}{F_{r_1}} \right) \quad (10)$$

The "adjustment factor" $F_A$ is obtained empirically by trial and error for each of the sixteen groups of particle sizes, such that the following equations are accurate compared to actual measurements of virgin and one-pass reclaim particles:

$$F_{r_1} = F_{v_1} \cdot P_1 \quad (11)$$

$$F_{r_2} = F_{v_2} \cdot P_2 \quad (12)$$

$$F_{r_{16}} = F_{v_{16}} \cdot P_{16} \quad (13)$$

That is, the actual measurements of particle size distribution $F_v$ and $F_r$ obtained initially by the laser diffraction particle size analyzer, as noted in equations (1) and (2), are employed to derive suitable adjustment values $F_A$ to ensure that the ultimate mathematic calculations of $F_{r_{16}}$ are as accurate as possible. Given the type of powder coating material noted above, the actual adjustment factors $F_{A_{1-16}}$ for the particle size ranges 0.5–1.9µ increasing to 87.2–188µ are preferably 1.0, 0.95, 0.90 . . . , 0.25, respectively.

Once each of the probability factors $P_{1-16}$ are calculated as set forth above, these values must also be normalized to 1.0 in the same manner as described above. The resulting, normalized values for $P_{1-16}$ can then be utilized as multipliers, e.g. times the particle size distribution of the virgin powder, to provide a mathematical prediction of the oversprayed particle size distribution for each cycle through the apparatus 10.

The foregoing discussion was based upon a mathematical model in which it was assumed, for simplicity, that no additional virgin powder material is added to the system, and the original quantity of powder material is recycled in successive coating operations. Because powder coating material adheres to objects such as vehicle bodies 32 within booth 12 under normal operating conditions and must be continuously replaced, a mathematical model which accounts for a given fraction of virgin powder coating material added to the system is required to approximate the actual operation of system 500.

Without repeating the calculations given above in equations (1)–(13), the following relationship is employed to represent the particle size distribution of the one-pass reclaim from equations (11)–(13):

$$F_r = F_v \cdot P \quad (14)$$

The term $F_r$ therefore represents the particle size distribution within the first-pass reclaim powder, as calculated using the mathematical model of equations (1)–(13).

After normalizing equation (14) to 1.0, and accounting for the addition of a volume fraction percentage y of new virgin powder added to the reclaim powder after the first pass or coating operation, the following relationship is derived:

$$F_{r_i}{}^y = (1-y) F_{r_i} + y F_v \quad (15)$$

Where:
y=volume fraction percentage of virgin powder coating material added to the system after the one-pass reclaim powder is collected.

$F_{r_i}^y$ particle size distribution of one-pass reclaim containing a fraction y of virgin powder coating material.

i=the index for the number of passes beginning with virgin powder coating material.

Having calculated a value for $F_{r_i y}$, the particle distribution of a subsequent "pass" or coating operation can be expressed as follows:

$$F_{r_{i+1}} = F_{r_i}^y \cdot P \qquad (16)$$

Equation (16) is normalized to 1.0, and then the following calculation is made:

$$F_{r_{i+1}}^y = (1-y) \cdot Fr_{i+1} + y \, F_v \qquad (17)$$

The term $F_r$ y represents the particle distribution within the second pass reclaim powder (i+1) containing a volume fraction y of virgin powder.

Figure 14:
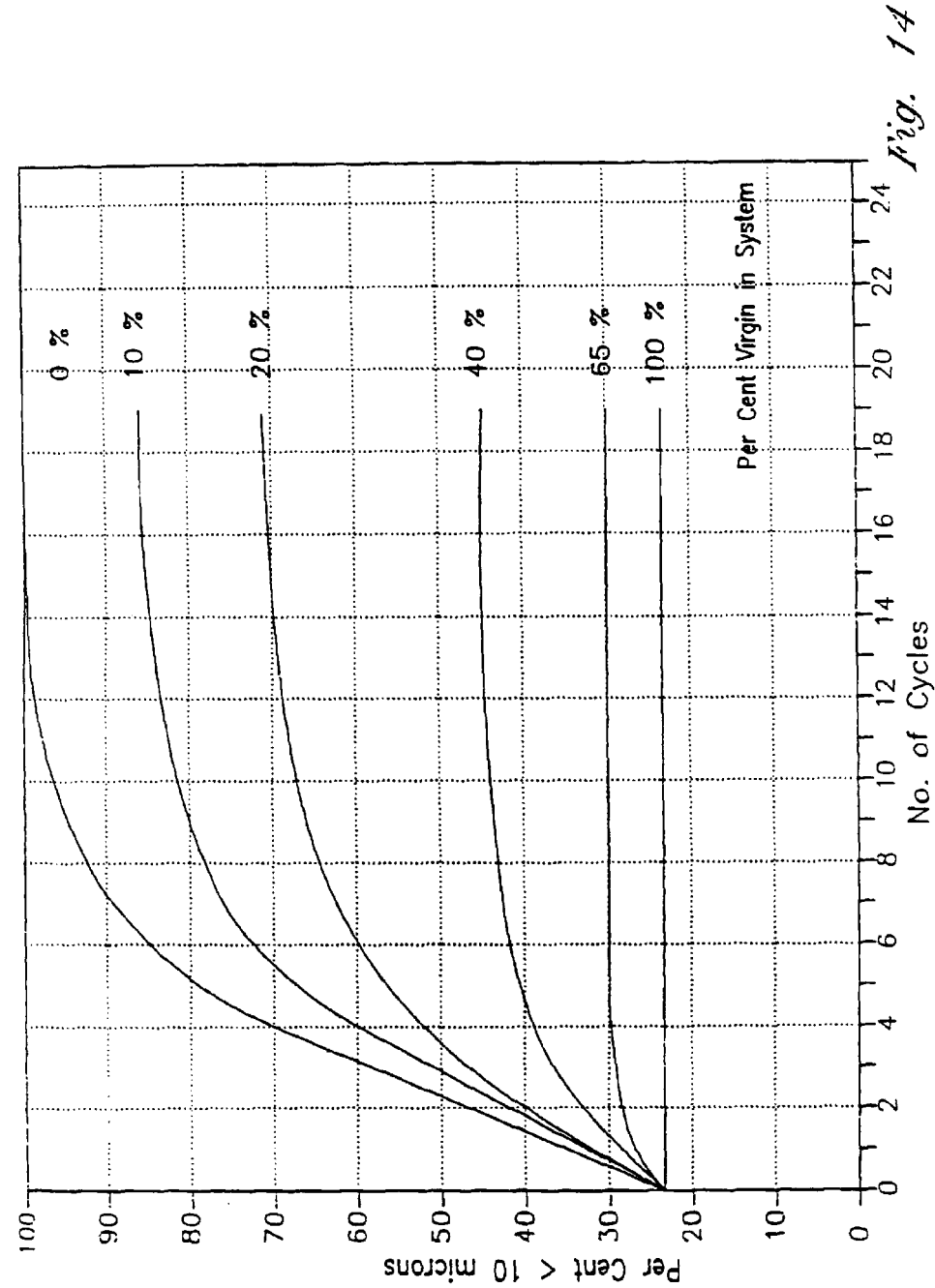
FIG. 14 is a calculated set of curves which graphically depicts the percentage of particulate powder coating material having a particle size of less than 10 microns which is present within powder coating material having different percentages of virgin powder after a given number of reclaim cycles.

This same series of calculations is repeated for a number of cycles so that curves of the type depicted in the graph of FIG. 14 can be generated. FIG. 14 is a representation of the volume percentage of fines present when spraying Ferro 158E 114 powder coating material wherein the fraction or volume percentage of virgin powder is varied. Each curve on the graph of FIG. 14 represents a different volume percentage of virgin powder y within the reclaim, and depicts how the volume percentage of fines changes with the number of cycles or successive coating operations. Based on calculations from equations (15) and (17) and successive iterations of same for all particle sizes (i+16), a calculated particle size distribution over the entire range of the sixteen particle size ranges is obtained. Software within the controller 108 is operative to sum the calculated volume percentage of all particles less than or equal to ten (10) microns within each of the sixteen size ranges, to obtain the values on the ordinate of the graph at FIG. 14 for each successive cycle or coating operation. Calculations for a number of different y values are included in FIG. 14 for purposes of illustration to provide an indication of how the volume percentage of fines varies with successive cycles and with differing fractions of virgin powder added to the reclaim powder.

The curves of FIG. 14 were mathematically derived from the above equations using Ferro 158E114 virgin powder coating material having a median particle size of about 22 microns. For this type of material, it has been found that the volume percentage of fines should be maintained less than about 30% to avoid the problems of excessive fines buildup noted above. From the graph of FIG. 14 it is observed that in order to maintain the volume percentage of fines less than 30%, a fraction y of virgin powder greater than 65% or on the, order of about 70% should be added to the system 500 during steady state operation. This is accomplished by operation of the controller 108 which selectively opens and closes the gate valve 508 in each line 504, 505 from the primary hopper 60 to the mixing hopper 502, and the gate valve 509 in each line 506, 507 extending between the reclaim and mixing hoppers 80, 502.

As described above, the mathematical model employed herein is useful to provide an indication of the percentage of fines within the mixing hopper 502 for powder coating materials containing different volume percentages of virgin powder. In turn, the appropriate volume fraction of virgin powder can be added to the mixing hopper 502 during steady state operation of the system 500 to avoid the accumulation of excessive fines within mixing hopper 502. As a safety precaution, the system 500 of this invention also includes software contained within the controller 108 which monitors the particle size distribution within the mixing hopper 502 to ensure that the actual percentage of fines within the mixing chamber 502 is consistent with that predicted by the mathematical model.

Figure 15:
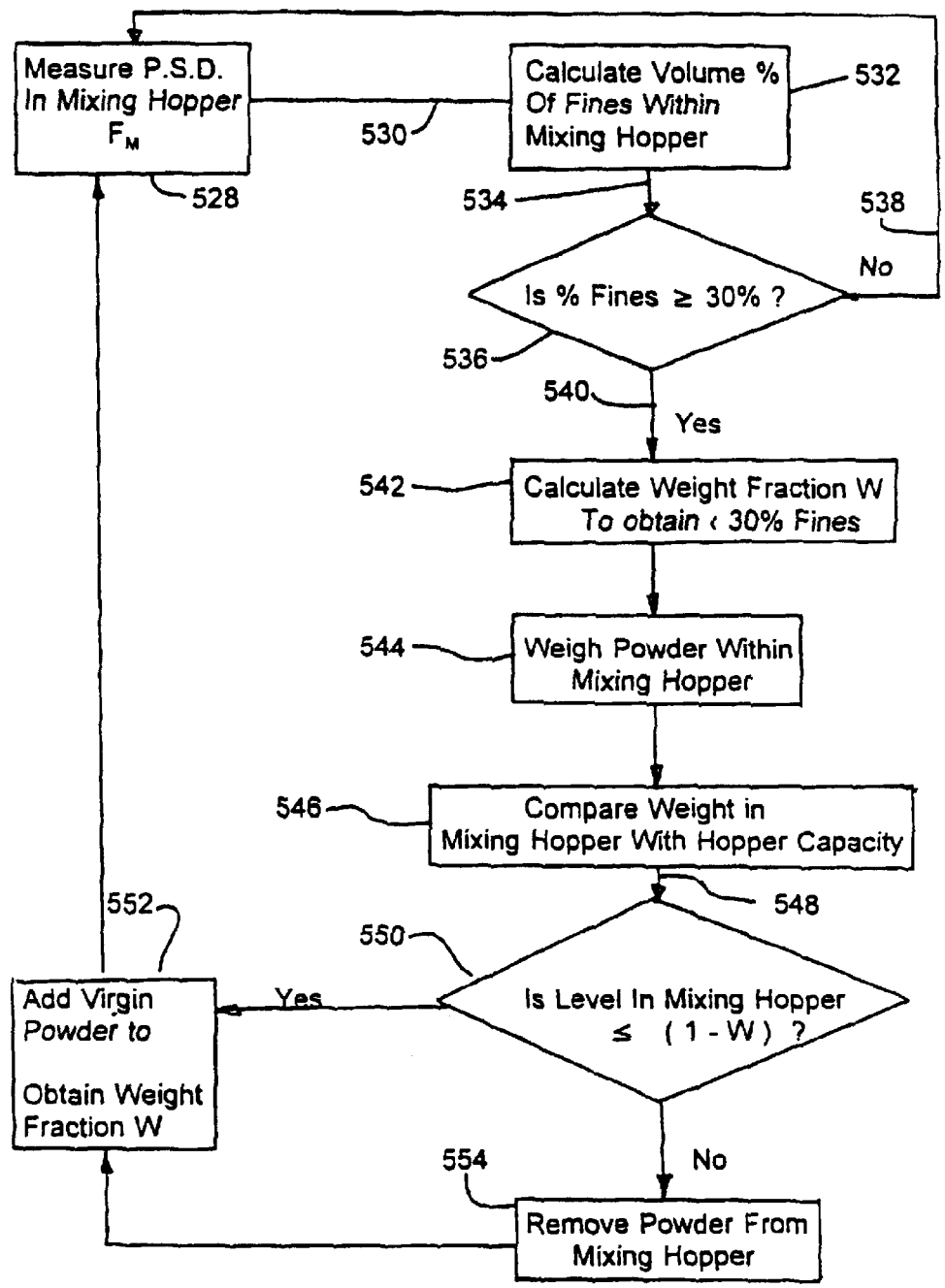
FIG. 15 is block diagram depiction of measuring and control functions performed by the controller employed in the embodiment of this invention illustrated in FIG. 10.

With reference to FIG. 15, a flow chart is provided which diagrammatically depicts the sequence of operations to perform the above-described monitoring function. Initially, a sample is manually withdrawn from the mixing hopper 502 and the same laser diffraction particle size analyzer mentioned above is employed to measure the actual particle size distribution within mixing hopper 502, $F_M$, as schematically depicted by block 528. The particle size distribution information is input from block 528 either manually or electronically to the controller 108 via line 530. Thereafter, all operations depicted in FIG. 15 are executed electronically within the software of controller 108. The controller 108 operates to calculate the volume percentage of fines, e.g. particles less than about 10 microns, contained within the mixing hopper 502. See block 532. A signal representative of such percentage volume calculation is input by line 534 to block 536 where a comparison is made between the calculated volume percentage and a predetermined maximum volume percentage of fines for the particular type of powder coating material being applied by system 500. In the illustrated embodiment shown in FIG. 15, a desired maximum volume percentage of 30% is nominally shown in block 536, although it should be understood that other minimum volume percentages of fines may be more appropriate for other types of coating materials. If the calculated percentage of fines is less than or equal to 30%, a "no" signal is sent by line 538 back to block 528, and the monitoring sequence is terminated until the next monitoring period begins, e.g. one day, one week or other desired periods.

In the event the calculated percentage of fines is determined within block 536 to exceed 30% by volume of the powder within mixing chamber 502, a signal is sent from block 536 through line 540 to block 542. The calculation performed by the controller 108 as denoted in block 542 involves the empirical selection of a weight fraction W, i.e. a fractional percentage such as 20%, 30% etc. The controller 108 then solves the following equation using the selected weight fraction W:

$$F_f = W \cdot F_v + (1-W) \cdot F_m \qquad (18)$$

Where:

$F_f$=desired volume percentage of fines within mixing hopper, e.g. <30%

W=weight fraction of virgin powder $F_m$=particle size distribution of powder within mixing hopper $F_v$=particle size distribution of virgin powder.

In the event the weight fraction W selected yields an $F_f$ value greater than 30%, then another, higher weight fraction W is selected and the calculations using equation (18) are repeated.

The next step in the monitoring sequence depicted in FIG. 15 is to weigh the powder within the mixing hopper, 502 using a load cell 106 of the type described above in connection with FIG. 1. See Box 544. The actual weight of the powder within mixing hopper 502 is then compared with the total weight capacity of mixing hopper 502, as schematically shown in block 546, and a signal representative of such calculation is input via line 548 to block 550. As depicted in block 550, the controller 102 is operative to cause virgin powder coating material to enter into the mixing hopper 502 in the event the level of powder within the mixing hopper 502 is less than or equal to 1−W (block 552).

If the mixing hopper 502 is too full to receive the weight fraction W of virgin powder coating material necessary to reduce the volume fraction of fines to the desired level, i.e. >(1−W), then the controller 108 initially causes the mixing hopper 502 to dump sufficient powder therefrom as depicted in block 554 before virgin powder coating material is added. The quantity of powder within the mixing hopper 502 which must be dumped or removed to make room for the virgin particulate powder coating material to be added can be determined from the following relationship:

$$Q_D = \left(\frac{MH_w}{MH_c} + W\right) - 1.0 \quad (19)$$

where:

$Q_D$=fraction of powder to be dumped from mixing hopper
$MH_W$=mixing hopper weight, as measured
$MH_C$=mixing hopper capacity The above-described series of weight calculations is therefore intended to make sure that there is sufficient capacity within the mixing hopper 502 to receive new virgin powder coating material, and therefore reduce the overall volume fraction of fines therein, without overflowing the mixing hopper 502. After the virgin powder coating material is added (block 552), the monitoring operation is terminated until the next monitoring period.

The above-described method of maintaining the desired proportion of reclaim powder coating material and virgin powder coating material within mixing hopper 502 is therefore dependent upon measurements of weight loss within the mixing hopper 502 as the coating operation proceeds. Alternatively, it is contemplated that the mixing hopper 502 could be supplied with the appropriate quantities of reclaim and virgin powder coating material based upon flow rate measurements instead of weight measurements. In this embodiment, the flow rate of powder coating material discharged from mixing hopper 502 is monitored over time, and predetermined quantities of both reclaim powder coating material and virgin powder coating material are added from the reclaim hopper 80 and primary hopper 60, respectively, into the mixing hopper 502 using flow control devices such as screw feeders (not shown). Preferably, a screw feeder or similar device associated with the primary hopper 60, and a separate screw feeder associated with the reclaim hopper 80, are activated by controller 108 in response to a signal from mixing hopper 502 and/or after a predetermined period of operation to introduce additional virgin powder coating material and reclaim powder coating material into the mixing hopper 502.

Powder Receivers

Referring to FIG. 2, the powder receiver 58 mentioned above in connection with a discussion of the system 10 of FIG. 1 is illustrated in detail. It should be understood that each of the other powder receivers 66, 82 and 94 are structurally and functionally identical to powder receiver 58, and therefore only one of the powder receivers is discussed in detail herein. Additionally, an alternative embodiment of a powder receiver 600 is disclosed below with reference to FIG. 11.

The powder receiver 58 includes a collector housing 128 having a hollow interior 130 within which a cartridge filter 132 is mounted by a plate 134. An access panel 136 is releasably secured by latches 138 along one side of the collector housing 128 to permit access to the cartridge filter 132. The interior 130 of collector housing 128 is vented by a vent 140, and its upper end is closed by a cap 142 secured thereto by latches 144. The cap 142 mounts a reverse air jet valve 146 in alignment with the open end of cartridge filter 132 connected to plate 134. The reverse air jet valve 146 is connected by a line 148 to an accumulator 150 which, in turn, is connected to the source 73 of pressurized air depicted schematically in FIG. 2. The cap 142 also carries a fitting 154 connected to a suction hose or line 61 from the first vacuum pump 62. The lower portion of collector housing 128 includes a powder inlet 158 connected to the line 56 from the container 54 carrying virgin powder coating material. The collector housing 128 tapers radially inwardly from the powder inlet 158, in a downward direction as depicted in FIG. 2, forming a tapered base portion 160 which includes external flanges 162.

As discussed above, in order for the load cell 106A associated with primary hopper 60 to function properly it must be "zeroed" or set at a zero weight reading with the primary hopper 60 completely empty of powder coating material. In this manner, only the powder coating material which actually enters the primary hopper 60 is weighed by the load cell 106A. In order to ensure an accurate weight reading of the powder is obtained within primary hopper 60, all of the elements associated with the first powder receiver unit 58 are supported independently of the primary hopper 60 upon a frame 164 depicted in FIG. 2. This frame 164 includes a top plate 166 supported on vertical legs 168, angled braces 170 extending between the top plate 166 and vertical legs 168, and, one or more horizontal supports 172 located at intermediate positions in between the vertical legs 168.

The collector housing 128 is mounted to the top plate 166 of frame 164 by bolts 174 extending between the external flange 162 of collector housing 128 and the top plate 166. Extending downwardly from the tapered base portion 160 of collector housing 128 is a flexible sleeve 176 which couples the collector housing 128 with a rotary air lock metering device 178 of the type commercially available from Premier Pneumatics, Inc. of Salina, Kans. under Model No. MDR-F-G-76-10NH-2-RT-CHE-T3. The metering device 178 is drivingly connected by a belt (not shown) to the output of a motor 182 carried on a support plate 184 connected to one of the vertical legs 168. The motor 182 is operative to rotate a series of internal vanes 186 within the metering device 178 which transfer a metered quantity of powder coating material from the tapered base portion 160 of collector housing 128 into a rotary sieve 196 mounted on a horizontal support 172. The rotary sieve 196 is a commercially available item of the type manufactured and sold by Azo Incorporated of Germany under Model No. E-240. The rotary sieve 196, in turn, transfers the powder coating material through a second flexible sleeve 198 into the powder inlet 200 of primary hopper 60 which is shown in more detail in FIG. 3 and described below.

In operation, the first vacuum pump 62 is activated by controller 108 drawing a vacuum along suction hose or line 61 to create a negative pressure within the hollow interior 130 of collector housing 128.

In turn, virgin powder coating material is drawn from the supply container 54 through line 56 and powder inlet 158 into the hollow interior 130 of collector housing 128. Some of the powder coating material falls by gravity into the tapered base portion 160 of collector housing 128, and another portion of the powder coating material collects on the walls of the cartridge filter 132. Periodically, pressurized air supplied from the accumulator 150 is transmitted in pulses through the reverse air jet valve 146 aligned with cartridge filter 132. These jets of air dislodge the powder coating material collected on the walls of filter 132 allowing it to fall downwardly into the tapered base portion 160 of collector housing 128.

The powder coating material is transferred from the collector housing 128 by the air lock metering device 178, in response to operation of motor 182, such that a metered quantity of powder coating material enters the rotary sieve 196. After passing through the rotary sieve 196, the powder coating material falls by gravity through the flexible sleeve 198 and into the powder inlet 200 of the primary hopper 60. When a predetermined quantity of powder coating material is collected within primary hopper 60, the load cell 106A associated therewith sends a signal to the controller 108, which, in turn, discontinues operation of the first vacuum pump 62. As mentioned above, all of the other powder receiver units 66, 82 and 94 in the powder transfer system of FIG. 1 are structurally and functionally identical.

Figure 11:
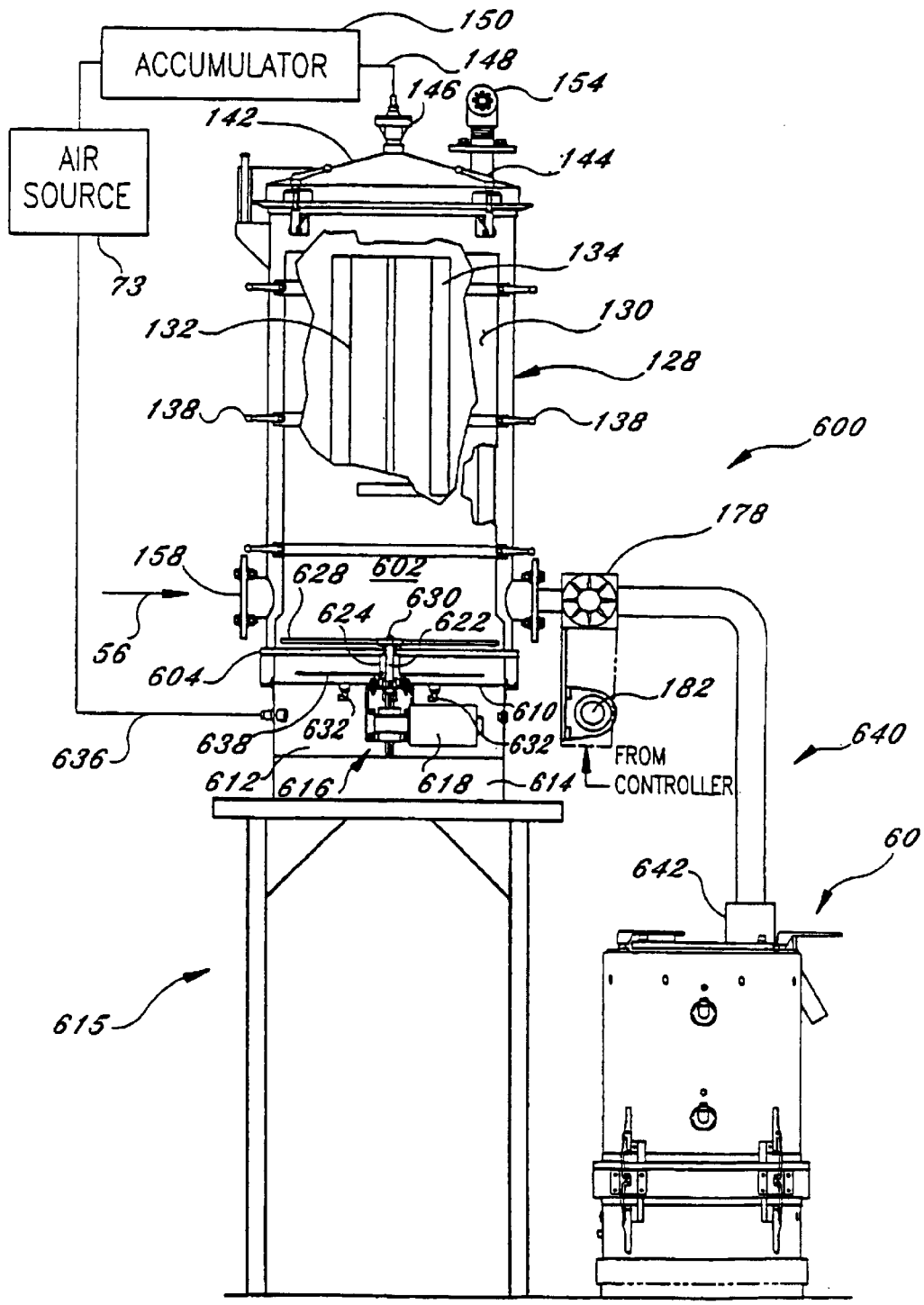
FIG. 11 is an elevational view in partial cross section of an alternative embodiment of the feed hopper shown in FIG. 5.

With reference to FIG. 11, an alternative embodiment of a powder receiver 600 is illustrated in detail. Powder receiver 600 is similar, in part, to powder receivers 58, 66, 82 and 94 described above in connection with a discussion of FIG. 2, and the same reference numbers are used in FIG. 11 to identify structure common to that of FIG. 2. One difference between powder receiver 600 and powder receiver 58 is the structure for transferring the powder coating material from the collector housing 128 to the primary hopper 60. It has been found that in some applications with certain types of powder material, intermittent flow stoppage has occurred due to arching or bridging of the coating material in the area of the tapered base portion 160 of powder receiver 58. When the tapered base portion 160 becomes blocked, powder coating material cannot be transported through the airlock metering device 178 into the rotary sieve 196 of the construction depicted in FIG. 2. In addition, the powder receiver 600 of FIG. 11 does not include a sieve 196 but it is contemplated that one could be placed atop the hopper 60 to sieve the particulate powder coating material prior to introduction into the hopper 60. Preferably, the sieve 196 is utilized at least where the powder coating material is initially introduced into the system, e.g. at receivers 58 and 82. See FIG. 1.

The powder receiver 600 of FIG. 11 is essentially constructed of the upper portion of the powder receiver 58 of FIG. 2, and a lower portion including structure for fluidizing the powder coating material directed into the collector housing 128 so that it can be smoothly transferred to the primary hopper 60. The bottom portion of collector housing 128 defines an interior including a fluidized bed 602 which extends between the cap 142, and a porous plate 604 which extends outwardly from the sidewall of collector housing 128 and is supported thereto by brackets (not shown). A second area within the base portion of collector housing 128 is an air plenum 608 which extends between the porous plate 604 and a circular mounting plate 610 carried by brackets mounted to the sidewall 129 of collector housing 128. A third area within the base portion of the collector housing interior is a motor chamber 612 extending between the mounting plate 610 and a bottom wall 614 of collector housing 128. The entire powder receiver 600 is preferably mounted atop a support stand 615 in position vertically above a primary hopper 60 or other hopper, for purposes to become apparent below.

The base portion of feed hopper 600 is provided with an agitator 616 which includes a motor 618 carried within the motor chamber 612 by a motor mount connected to the mounting plate 610. The output of motor 618 is drivingly connected to a shaft 622 rotatably carried within a bearing 624. The bearing 624 is mounted by a bearing mount to the mounting plate 610 and extends vertically upwardly through the air plenum 608 to a point immediately above the porous plate 604. At least two entrainment arms 628 are secured by a lock nut 630 at the top of shaft 622 which extends through bearing 624, so that in response to operation of motor 618 the entrainment arms 628 are rotated with respect to the porous plate 604 at a location thereabove.

At least two air inlets 632 are connected by tubes to an air supply line 636, in a manner not shown, which enters one side of the motor chamber 612. This air supply line 636, in turn, is connected to the source of pressurized air 73. An upwardly directed flow of air is provided through the air inlet 632 into the air plenum 608 where the air is deflected by baffles 638 mounted to the bearing 624. The purpose of these baffles is fully disclosed in U.S. Pat. No. 5,018,909, owned by the assignee of this invention, the disclosure of which is incorporated by reference in its entirety herein.

A transfer tube 640 is connected at one end to the collector housing 128 above the porous plate 604 and within the fluidized bed 602. The other end of the transfer tube 640 mounts to the inlet 642 of primary hopper 60. Preferably, a rotary air lock 178, driven by a motor 182, both of the same type described above in connection with a discussion of powder receiver 58, is connected in the transfer tube 640. As schematically depicted in FIG. 11, operation of the motor 182, and, hence, the rotary air lock 178, is controlled by the controller 108. In response to the operation of rotary air lock 178, powder coating material from the fluidized bed 602 within powder receiver 600 flows by gravity downwardly through the transfer tube 640, and then into the interior of primary hopper 60. The motor 182 is deactivated to stop operation of rotary air lock 178, as desired, to halt the flow of powder coating material through transfer tube 640. It has been found that this configuration of powder receiver 600 provides a smooth transfer of powder to the primary hopper 60, and it is contemplated that such powder receiver 600 could be utilized as an alternative in the embodiments of both FIGS. 1 and 10. The powder receiver 600 otherwise functions in the same manner as powder receiver 58 described above, and the discussion of such operation is not repeated herein.

Primary and Reclaim Hoppers

Figure 3:
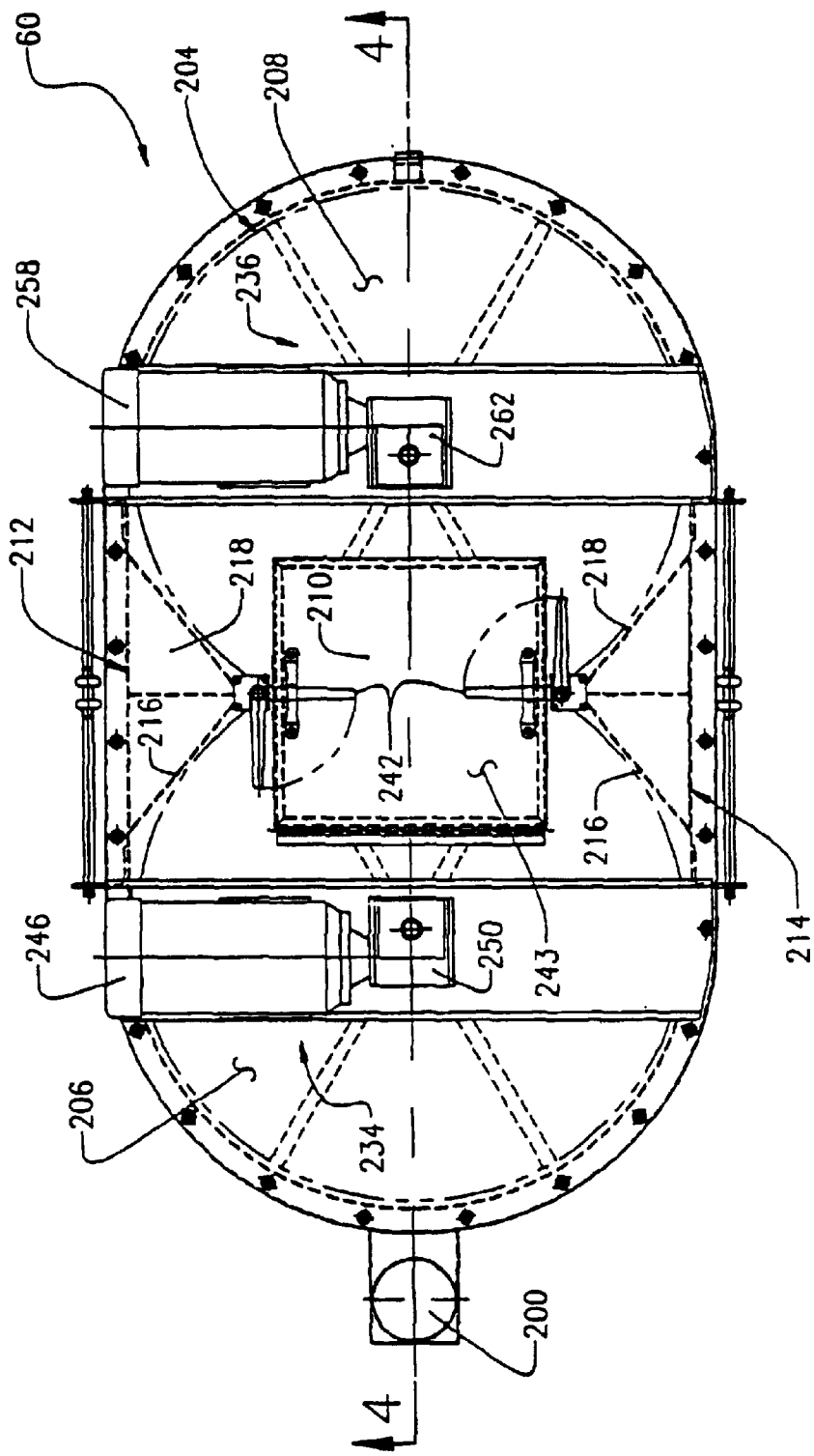
FIG. 3 is a plan view of the primary hopper shown in FIG. 1.
Figure 4:
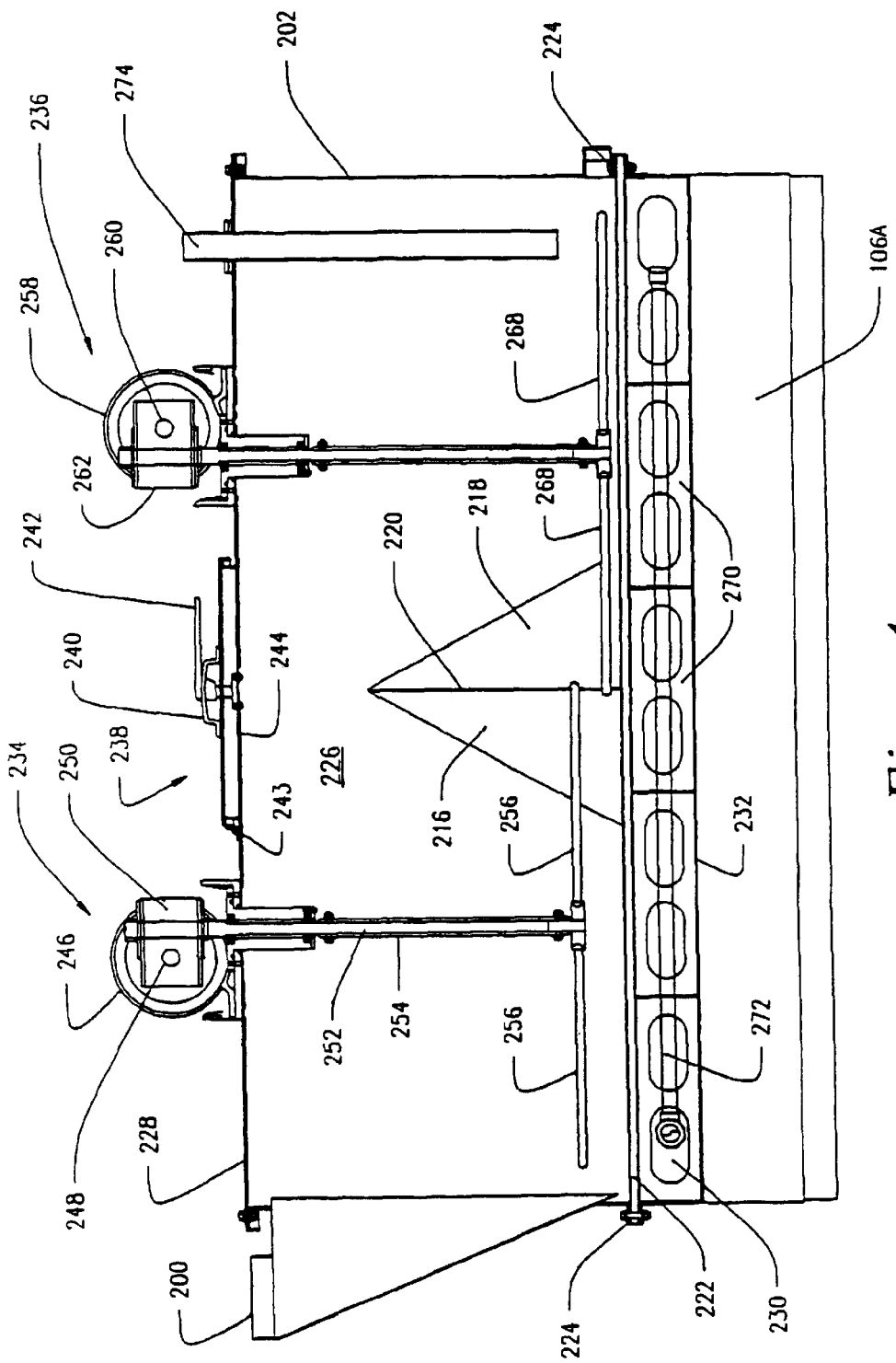
FIG. 4 is a cross-sectional view taken generally along line 4—4 of FIG. 3.

The primary hopper 60 and reclaim hopper 80 are essentially identical to one another, and, for purposes of discussion, only the primary hopper 60 is illustrated and described in detail. With reference to FIGS. 3 and 4, the primary hopper 60 comprises a housing 202 having an internal wall 204 in the general shape of a "figure 8". As such, the internal wall 204 includes two circular-shaped portions 206 and 208 which meet at a reduced diameter area 210 at the center of housing 202 defined by opposed, triangular-shaped baffles 212 and 214 each connected to one side of the housing 202. Each of the baffles 212, 214 have a pair of side panels 216, 218 which extend inwardly from a wall of the housing 202 and meet to form an apex 220 toward the center of the housing interior 203.

As best shown in FIG. 4, a porous plate 222 is carried by mounts 224 near the base of housing 202 which separates the housing interior 203 into a fluidized bed 226 located between the porous plate 222 and the top wall 228 of housing 202, and an air plenum 230 located between the porous plate 222 and the bottom wall 232 of the housing 202. The air plenum 230 contains a number of baffles 270 and a generally U-shaped, perforated air tube 272. The bottom wall 232 rests atop the load cell 106A, discussed above in connection with the powder transfer system of this invention.

The top wall 228 of housing 202 supports a first agitator 234, a second agitator 236 and an access cover 238 having a handle 240 and latch mechanisms 242 which is mounted by a hinge 243 over an opening 244 in the top wall 228. This opening 244 is offset from the powder inlet 200 of primary hopper 60 so that access to in housing interior 203 for maintenance or the like can be obtained without interference with the powder inlet 200. The first agitator 234 includes a motor 246 connected by a shaft 248 to a gear box 250. The output of gear box 250 is drivingly connected to a shaft 252 encased within a tube 254. The lower end of shaft 252 mounts at least two agitator paddles 256 which are rotatable within the circular portion 206 of the housing interior 203 formed by internal wall 204, at a location vertically above the porous plate 222. The second agitator 236 has a similar construction to first agitator 234. Second agitator 236 includes a motor 258 having a shaft 260 connected to a gear box 262 whose output is drivingly connected to a shaft 264 encased within a tube 266. Two or more paddles 268 are mounted at the base of shaft 264 within the other circular portion 208 of housing interior 203 formed by internal wall 204. As depicted in FIG. 4, the shaft 264 and tube 266 associated with second agitator 236 are slightly longer than their counterparts in the first agitator 234 so that the paddles 268 of second agitator 236 are located closer to the porous plate 222 than those of first agitator 234. The paddles 256, 268 overlap but do not interfere with one another because of the vertical offset.

As mentioned above, one aspect of this invention is to provide for the transfer of large quantities of powder coating material e.g. on the order of 300 pounds per hour and up, at flow rates of 1–2 pounds per second, while maintaining the desired density and particle distribution within the flow of powder coating material. As noted above, the term "density" refers to the relative mixture or ratio of powder to air, and the term "particle distribution" refers to the disbursion of powder particles of different sizes within the flow of powder coating material. The primary hopper 60 and reclaim hopper 80 are designed to meet the desired density and particle distribution requirements at high throughputs of powder coating material.

In operation, pressurized air is introduced into the perforated air tube 272 within air plenum 230 creating an upward flow of air which is evenly distributed by the baffles 270 across the bottom of porous plate 222. Powder coating material is introduced into the housing interior 203 through its powder inlet 200 and distributed along the porous plate 222 by the upward, fluidizing air flow therethrough and by operation of the first and second agitators 234, 236. The "figure 8" shape of the housing interior 203 defined by internal wall 204 substantially eliminates "dead spots" therein as the agitator paddles 256, 268 move relative to the porous plate 222 so that the powder coating material is evenly distributed along the entire surface area of porous plate 222 and agglomeration or bunching up of the powder material is substantially eliminated. This produces an even, uniform powder distribution within the fluidized bed 226 having the desired particle distribution and density. In response to activation of the third vacuum pump 69, air entrained, powder coating material is withdrawn from the housing 202 of primary hopper 60 through a suction tube 274 inserted within the housing interior 203, which, in turn, is connected to transfer line 64 described above.

Feed Hoppers

The first and second feed hoppers 68 and 96 are essentially identical in construction and therefore only the details of first feed hopper 68 are discussed herein. With reference to FIG. 5, feed hopper 68 comprises a housing 276 having a top wall 278 formed with an opening closed by a cover 279, a substantially cylindrical-shaped side wall 280 and a bottom wall 282 carried by the load cell 106B. The housing 276 defines an interior which is separated into essentially three discreet areas. One area is a fluidized bed 284 extending between the top wall 278 and a porous plate 286 which extends outwardly from the housing side wall 280 and is supported thereto by brackets 288. A second area within the housing 276 is air plenum 290 which extends between the porous plate 286 and a circular mounting plate 292 carried by brackets 294 mounted to the side wall 280. The third area within the interior of housing 276 is a motor chamber 296 extending between the mounting plate 292 and bottom wall 282.

The feed hopper 68 is provided with an agitator 298 which includes a motor 300 carried within the motor chamber 296 by a motor mount 302 connected to the mounting plate 292. The output of motor 300 is drivingly connected to a shaft 304 rotatably carried within a bearing 306. The bearing 306 is mounted by a bearing mount 308 to the mounting plate 292 and extends vertically upwardly through the air plenum 290 to a point immediately above the porous plate 286. At least two paddles 308 are secured by a lock nut 310 at the top of shaft 304 which extends through bearing 306, so that in response to operation of motor 300 the paddles 308 are rotated with respect to the porous plate 286 at a location immediately thereabove.

At least two air inlets 312, carried by mounting plate 292, are connected by tubes 314 to an air supply line 316, in a manner not shown, which enters one side of the motor chamber 296. This air supply line 316, in turn, is connected to the source of pressurized air 73 described above in connection with the powder receivers. An upwardly directed flow of air is provided through the air inlets 312 into the air plenum 290 where the air is deflected by baffles 318 mounted to the bearing 306. These baffles 318 are of the same type employed in powder receiver 600, and as disclosed in U.S. Pat. No. 5,018,909, mentioned above.

In operation, powder coating material is introduced into the fluidized bed 284 of housing 276 through a tapered, powder inlet 320 mounted along the side wall 280 of housing 276. The motor 300 is operative to rotate paddles 308 so that the powder coating material is evenly distributed along the porous plate 286 with no dead spots. The powder coating material is fluidized along the porous plate 286 by the upwardly directed flow of air from air supply line 316 and air inlets 312. In order to remove the powder coating material from housing 276, one or more powder pumps such as pump 74 is operated to draw the powder coating material through a suction tube 322 which extends into the housing interior immediately above the porous plate 286. A number of suction tubes 322 are shown in FIG. 5 for purposes of illustrating that multiple powder pumps 74 could be employed to draw powder from feed hopper 68.

Robot Hopper

Figure 6:
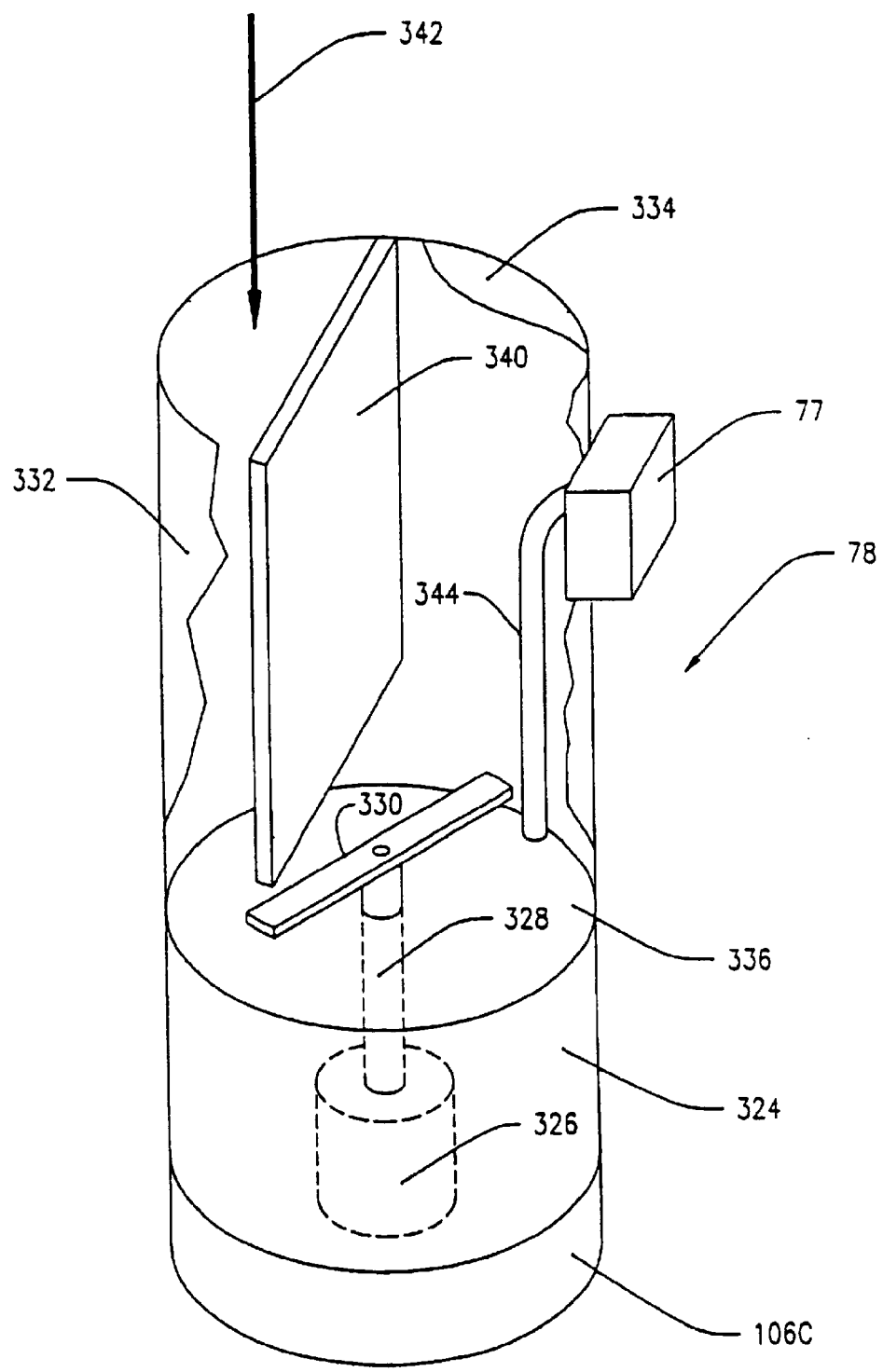
FIG. 6 is a schematic, partially cut-away view of a robot hopper of this invention.

The robot hopper 78 schematically depicted in FIG. 1 is shown in more detail in FIG. 6. In the presently preferred embodiment, the robot hopper 78 includes a cylindrical base forming a combined air plenum and motor chamber 324 which houses a motor 326 drivingly connected to a shaft 328 whose upper end mounts one or more paddles 330. The top portion of robot hopper 78 includes a cylindrical housing 332 having a top wall 334 and a bottom wall formed by a porous plate 336 which communicates with the air plenum and motor chamber 324. The cylindrical housing 332 defines a fluidized bed 338 within which a rectangular-shaped plate or baffle 340 is mounted. The baffle 340 is vertically spaced above the porous plate 336 and divides the fluidized bed 338 into two sections. In one section or side of baffle 340, powder coating material from feed hopper 68 is introduced through a powder inlet 342 schematically depicted at the top of the cylindrical housing 332. A suction tube 344 associated with the powder pump 79 is mounted to cylindrical housing 332 on the opposite side of baffle 340, and this suction tube 344 terminates immediately above the porous plate 336.

The robot hopper 78 receives powder coating material via line 76 from powder pump 74 associated with feed hopper 68. The powder coating material enters the powder inlet 342 of cylindrical housing 332 and is directed downwardly along one side of baffle 340 onto the porous plate 336. The motor 326 is operative to rotate paddles 330 immediately above the porous plate 336 so that a uniform flow of air entrained powder material can be withdrawn by the powder pump 79 through suction tube 344 for transmission to the robot 40 and its associated spray guns 42. It has been found that the presence of baffle 340 within the interior of cylindrical housing 332 assists in stabilizing the fluidization of powder coating material across the porous plate 336 to ensure that the desired density and powder distribution within the flow of powder coating material withdrawn by powder pump 79 is maintained.

Powder Collection and Recovery System

With reference to FIGS. 1 and 7–9, the powder collection and recovery system 16 is illustrated in further detail. This system 16 is generally related to that disclosed in U.S. Pat. No. 5,078,084 to Shutic, et al., the disclosure of which is incorporated by reference in its entirety herein. As noted above, the powder collection and recovery system 16 is located below the floor 20 of powder spray booth 12 on either side of the center portion 36 of booth 12 along which the vehicle bodies 32 are transported by conveyor 34. As depicted at the left hand portion of FIG. 7, gratings 38 cover the booth floor 20 so that oversprayed, air entrained powder coating material can be drawn downwardly from any area within the booth interior 30 into the system 16.

The powder collection and recovery 16 is modular in construction and generally comprises a series of powder collection units 346 mounted side-by-side and extending longitudinally along the entire length of the booth 12. See center of FIG. 7. The powder collection units 346 are connected in groups of three or four, for example, to individual fan or blower units 348 located beneath the powder collection units 346, as shown in FIG. 1 and the right side of FIG. 7. Each of the powder collection units 346 includes a collector housing 350 having opposed side walls 354, 356, opposed end walls 358, 360 and an angled or sloped bottom wall 362. A clean air chamber 364 is located at the top of collector housing 350 which is formed by a pair of inwardly angled support plates 366, 367 each having a number of spaced openings 368, opposed side plates 369, 370, and, a pair of access doors 371, 372 which are hinged to the side plates 369, 370, respectively. The clean air chamber 364 extends across the length of collector housing 350 and connects to an extension 373, the purpose of which is described below. The lower portion of collector housing 50 forms a powder collection chamber 374 having tapered sidewalls and a bottom wall defined by a porous plate 376. The porous plate 376 is mounted above the base 362 of collector housing 350, at an angle of approximately five degrees with respect to horizontal, which forms an air plenum 377 therebetween. An upwardly directive flow of air is introduced into the air plenum 377 beneath the porous plate 376 through an inlet (not shown) so that powder coating material entering the powder collection chamber 374 is fluidized atop the porous plate 376.

Figures 8, 9:
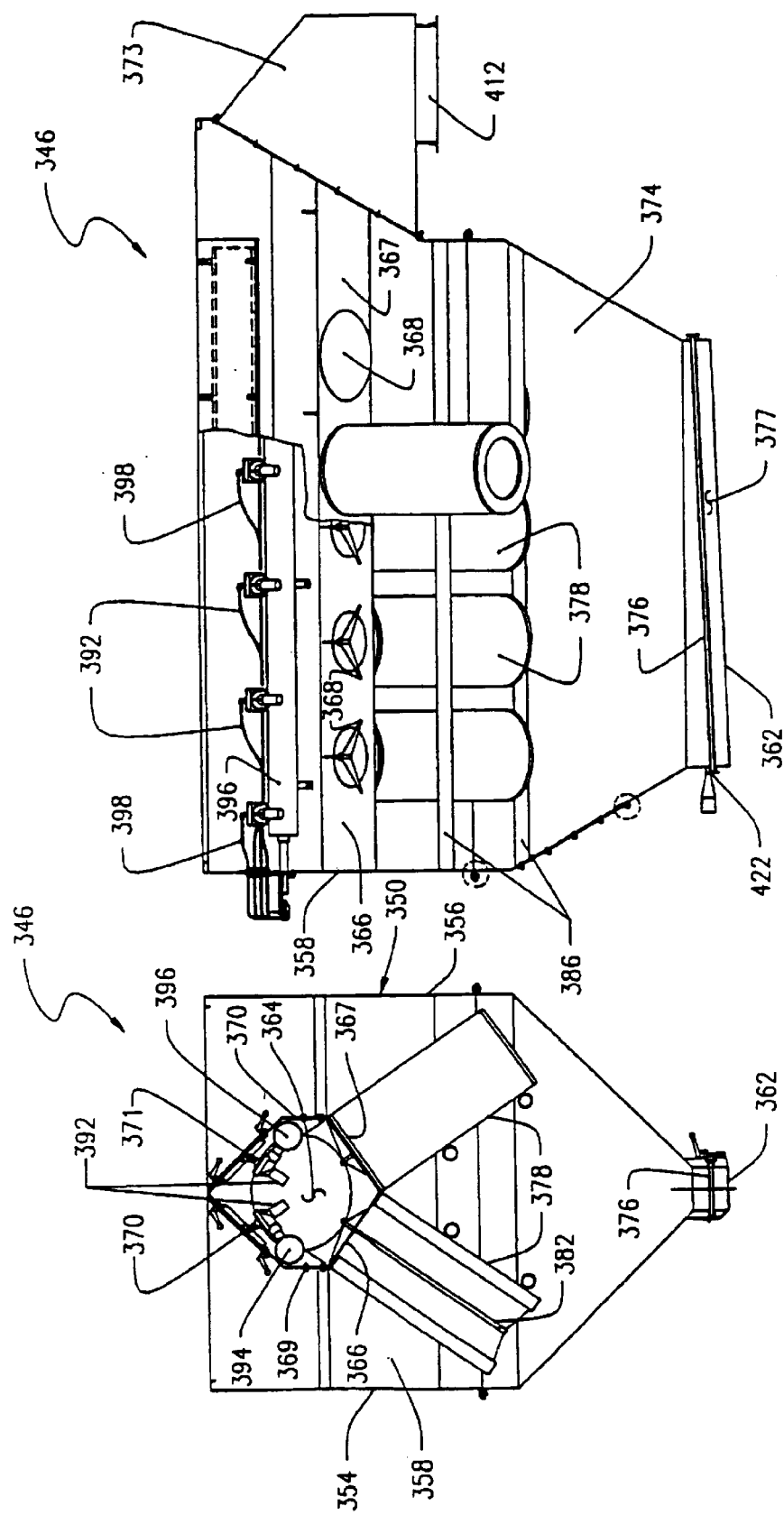
FIG. 8 is an end view of a powder collection chamber.
FIG. 9 is a side view of the powder collection chamber depicted in FIG. 8.

In the presently preferred embodiment, two groups or banks of cartridge filters 378 are located within the powder collection chamber 374 and are arranged in an inverted V shape as seen in FIG. 8. The open top of each cartridge filter 378 is carried by one of the support plates 366, 367 of clean air chamber 364 in position over an opening 368 in such plates 366, 367. Each cartridge filter 378 has a central rod 382 threaded at its upper end to receive a mount 384 which is tightened down on the rod 382 such that one of the support plates 366 or 367 is sandwiched between the mount 384 and the top of a cartridge filter 378. Preferably, one or more filter mounting plates 386 extending between end walls 358, 360 of collector housing 350 provide additional support for each cartridge filter 378.

In order to dislodge powder coating material from the walls of the cartridge filters 378, which enters the collector housing 350 as discussed below, a set or group of air jet nozzles 392 is provided for each bank of cartridge filters 378. One set of air jet nozzles 392 is carried on a nozzle support 394 mounted within clean air chamber 364, and the second set of air jet nozzles 392 is carried on a nozzle support 396 within the clean air chamber 364. As depicted in FIG. 8, each set of air jet nozzles 382 is aimed at the open tops of one group or bank of cartridge filters 378. The air jet nozzles 392 associated with each bank of cartridge filters 378 are connected by air lines 398 to a pneumatic valve 400, which, in turn, is connected to the source 73 of pressurized air. In response to a signal from the system controller 108, the pneumatic valves 400 are operated to selectively direct pressurized air through air lines 398 so that a jet of pressurized air is emitted from the air jet nozzles 392 into the interior of one or both of the banks of cartridge filters 378. These pulsed jets of air dislodge powder coating material from the walls of the cartridge filters 378 so that it can fall by gravity into the powder collection chamber 374 and onto the porous plate 376.

Figure 7:
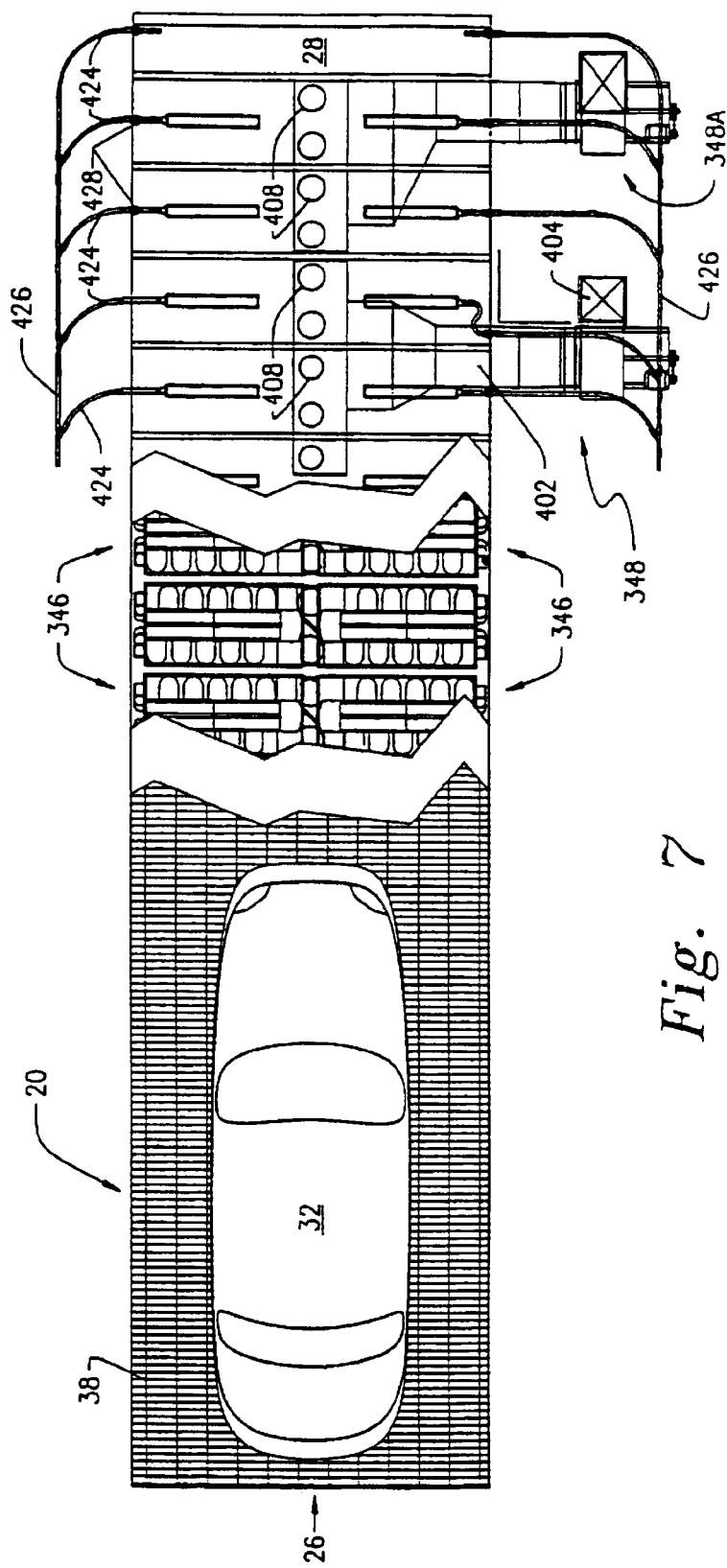
FIG. 7 is a schematic, partially cut-away view of the powder collection and recovery system herein.

With reference to FIGS. 1 and 7, air entrained powder coating material is drawn into each of the powder collection units 346 from the booth interior 30 under the application of a negative pressure exerted by the blower units 348 mentioned above. Each of the blower units 348 includes a fan plenum 402 which houses a fan or blower 404 and a number of final filters 406 depicted schematically in FIG. 1. The fan plenum 402 is formed with a number of openings 408 over which an exhaust duct 410 is fixedly mounted. Each exhaust duct 410 extends vertically upwardly into engagement with a coupling 412 located at the base of one of the extensions 373 of the clean air chambers 364 associated with each powder collection unit 346. In response to the operation of blower 404 within fan plenum 402, a negative pressure is developed within the exhaust duct 410 and, in turn, within the clean air chamber 364 associated with each of the powder collection units 346. This negative pressure creates a downwardly directed flow of air in the booth interior 30 within which oversprayed powder coating material is entrained. The air entrained powder coating material passes through the gratings 38 at the floor 20 of the spray booth 12 and enters each of the powder collection units 346 where the powder coating material is collected along the walls of the cartridge filters 378 or falls onto the porous plate 376 at the base of collector housing 350.

An important aspect of the powder collection and recovery system 16 of this invention is that one blower unit 348 services a limited number of powder collection units 346.

For example, the blower unit 348A depicted on the right hand portion of FIG. 7 has a fan plenum 402 formed with four openings 408 each of which receive an exhaust duct 410 connected to one powder collection unit 346. Accordingly, four powder collection units 346 are accommodated by one blower unit 348A. Other blower units 348 are associated with relatively small groups of adjacent powder collection units 346 which results in the application of a uniform, downwardly directed flow of air throughout the booth interior 30. Further, the configuration of the clean air chamber extensions 373 of each powder collection unit 346 permits the powder collection units 346 on one side of spray booth 12 to "dovetail" or fit closely adjacent the powder collection units 346 on the opposite side of booth 12. See center of FIG. 7. This conserves space and reduces the overall dimension of the booth 12.

Another aspect of the powder collection and recovery system 16 of this invention is the retrieval of collected, oversprayed powder from the powder collection units 346 for recirculation back to the powder kitchen 14. As mentioned above, air entrained powder material from the booth interior 30 is drawn into each of the powder collection units 346 and falls either by gravity onto the porous plate 376 at the base thereof or is dislodged from the walls of the cartridge filters 378 by periodic bursts of pressurized air emitted from the air jet nozzles 392. In the presently preferred embodiment, movement of the powder onto the porous plate 376 is assisted by the forming of the walls 354–362 of the collector housing 350 of each powder collection unit 346 of a relatively thin gauge metal, such as 18–20 gauge No. 304 stainless steel, so that they vibrate when the reverse jets of pressurized air are emitted from air jet nozzles 392. Because the porous plate 376 is angled at about five degrees with respect to horizontal, the fluidized powder coating material thereon flows toward an outlet 422 on one side of the collector housing 350 at the lower end of porous plate 376. In turn, each of the outlets 422 of powder collection units 346 is connected by a branch line 424 to a common header pipe 426 which extends longitudinally along the length of powder booth 12 on both sides thereof. The header pipe 426 is connected to the reclaim line 86 which leads to the third powder receiver 82 within the powder kitchen 14. Preferably, a guillotine-type gate valve 428 is carried within each branch line 424, and these valves 428 are movable between an open position to permit the flow of powder coating material therethrough and a closed position to prevent such flow.

In response to activation of the third vacuum pump 84 within the powder kitchen 14, which is associated with third powder receiver 82 and reclaim hopper 80 as described above, a negative pressure is produced within the header pipe 426. The system controller 108, mentioned above in connection with the powder transfer system, is operative to selectively open the gate valves 428 associated with each powder collection unit 346 so that the powder therein is drawn through their respective branch lines 424 into header pipe 426. Because of the large number of powder collection units 346, only a predetermined number of gate valves 428 are opened at any given time to limit the total amount of powder material which is allowed to enter the header pipe 426 for transfer to the reclaim line 86 leading to the third powder receiver 82 and primary hopper 80.

With reference to FIG. 1, a pressure sensor 430 is schematically depicted as being connected to the fan plenum 402 of the blower unit 348. The purpose of pressure sensor 430 is to sense the pressure drop across final filters 406 within blower unit 348 and send a signal representative of same to the controller 108. In the event of a failure or other problem with one or more cartridge filters 378 within the powder collection unit 346 associated with a given blower unit 348, the passage of powder coating material into the clean air chamber 364 and then to the final filters 406 creates a pressure drop across the final filters 406. This pressure drop is sensed by the pressure sensor 430 at which time a signal representative of such pressure drop is sent to the controller 108 to alert the operator of a problem within such powder collection unit 346. Because there are a number of blower units 348, each associated with a group of powder collection units 346, a failure within the powder collection and recovery system 16 can be pinpointed and attributed to one blower unit 348 and an associated group of powder collection units 346. This facilitates maintenance of the system and avoids the operator having to check each of the blower units 348 for such problems.

While the invention has been described with reference to a preferred embodiment, it should be understood by those skilled in the art that various changes may be made and equivalence may be substituted for elements thereof without departing from the scope of the invention. In addition, many modifications may be made to adapt a particular situation or material to the teachings of the invention without departing from the essential scope thereof.

For example, the system 10 of this invention has been depicted with a single primary hopper 60, a single reclaim hopper 80, a feed hopper 68 associated with a robot hopper 78 and robot 40, and, a feed hopper 96 associated with an overhead gun manipulator 44. It should be understood that the embodiment of system 10 depicted in the Figs. and described above is intended for purposes of illustration of the subject matter of this invention, and that the system 10 could be modified depending upon the requirements of a particular application. Multiple primary hoppers 60 and reclaim hoppers 80 can be employed, and a variety of spray gun configurations can be utilized including automatically and manually manipulated guns supplied with different combinations of feed hoppers and/or robot hoppers.

Therefore, it is intended that the invention not be limited to the particular embodiment disclosed as the best mode contemplated for carrying out this invention, but that the invention will include all embodiments falling within the scope of the appended claims.

We claim:

1. A powder coating system having at least one dispenser for spraying powder onto objects transmitted to a powder spray booth, comprising:

a primary hopper containing powder coating material, a second hopper;

a transfer device, connected between said primary hopper and said second hopper, which transmits powder coating material under the application of negative pressure through a conduit connected between said primary hopper and said second hopper by means of a vacuum pump communicating with said conduit;

a sensor which is effective to sense the quantity of powder coating material within said second hopper; and a controller which turns on said vacuum pump to transfer powder from said primary hopper to said second hopper when said sensor indicates that the quantity of powder coating material in said second hopper has reached a first predetermined amount, said controller turning off said vacuum pump to terminate the transfer of powder when said sensor indicates that the quantity of powder coating material in said second hopper has reached a second predetermined amount, said controller opening a valve communicating with said conduit and a compressed air source to supply compressed air into said conduit to push powder coating material through said conduit into said second hopper.

2. The system of claim 1 wherein said controller opens said valve substantially simultaneously with turning off said vacuum pump.

3. The system of claim 1 wherein said sensor is a load cell which supports said second hopper, said load cell being effective to sense changes in weight of the powder coating material within said second hopper.

4. The system of claim 1 wherein said transfer device includes a powder receiver unit, said powder receiver unit being supported independently of said second hopper so that said load cell which supports said second hopper measures only the weight of the powder coating material in said second hopper.

* * * * *